Figure 1:
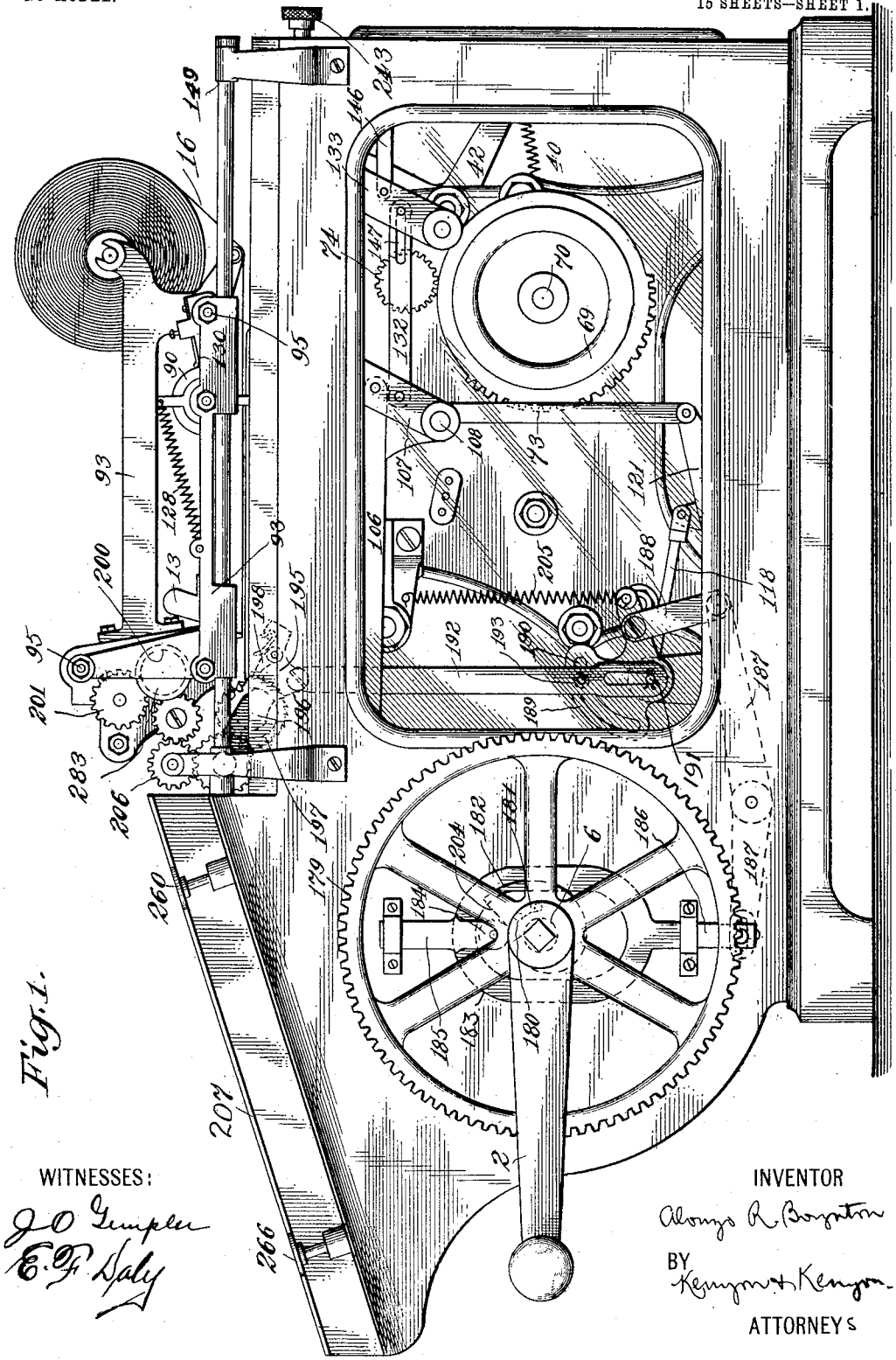

No. 745,145. PATENTED NOV. 24, 1903.
A. R. BOYNTON.
PRINTING MACHINE.
APPLICATION FILED OCT. 23, 1902.
NO MODEL. 15 SHEETS—SHEET 1.

WITNESSES:

INVENTOR
Alonzo R. Boynton
BY
Kenyon & Kenyon
ATTORNEYS

No. 745,145. PATENTED NOV. 24, 1903.
A. R. BOYNTON.
PRINTING MACHINE.
APPLICATION FILED OCT. 23, 1902.
NO MODEL. 15 SHEETS—SHEET 2.

WITNESSES:
INVENTOR.

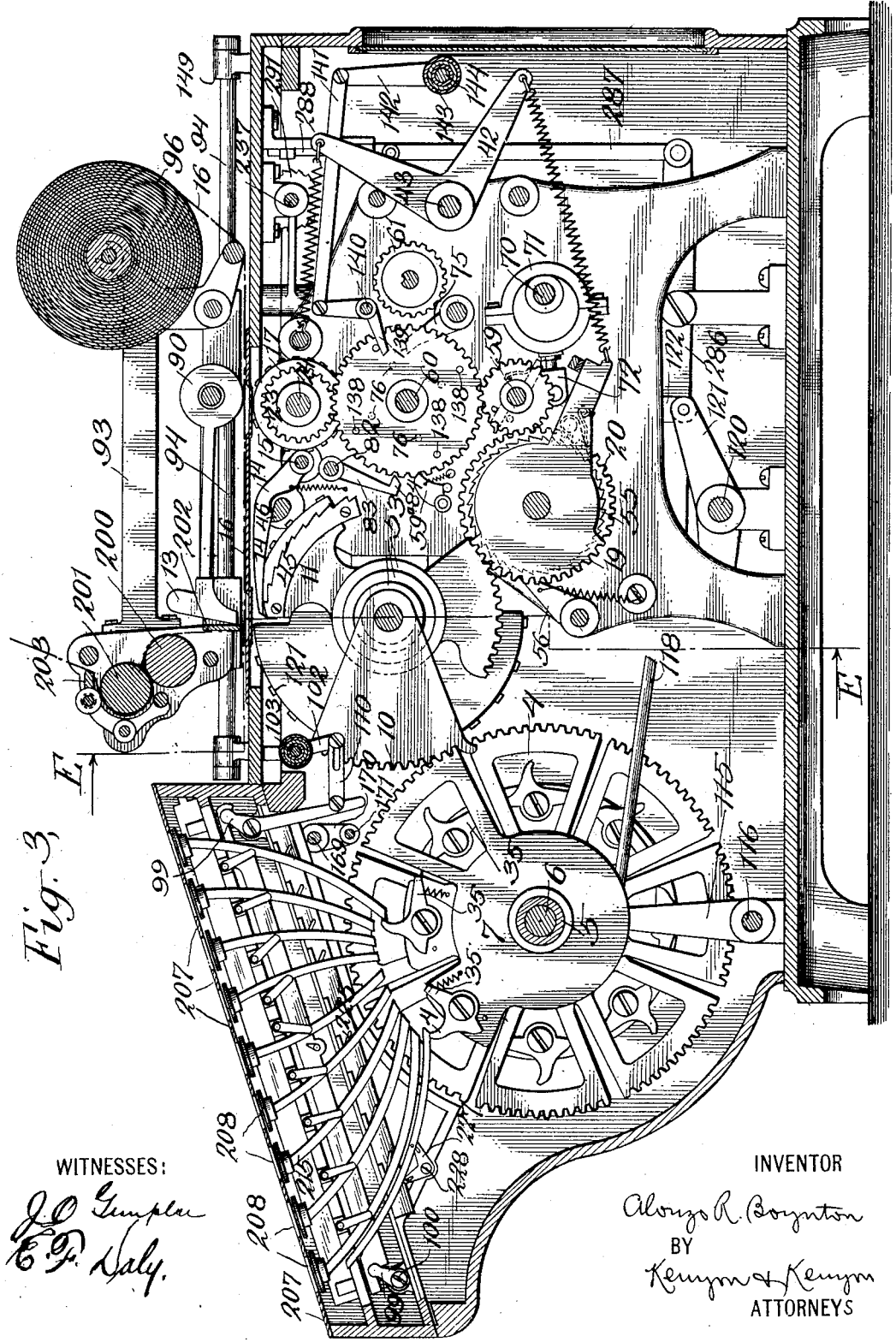

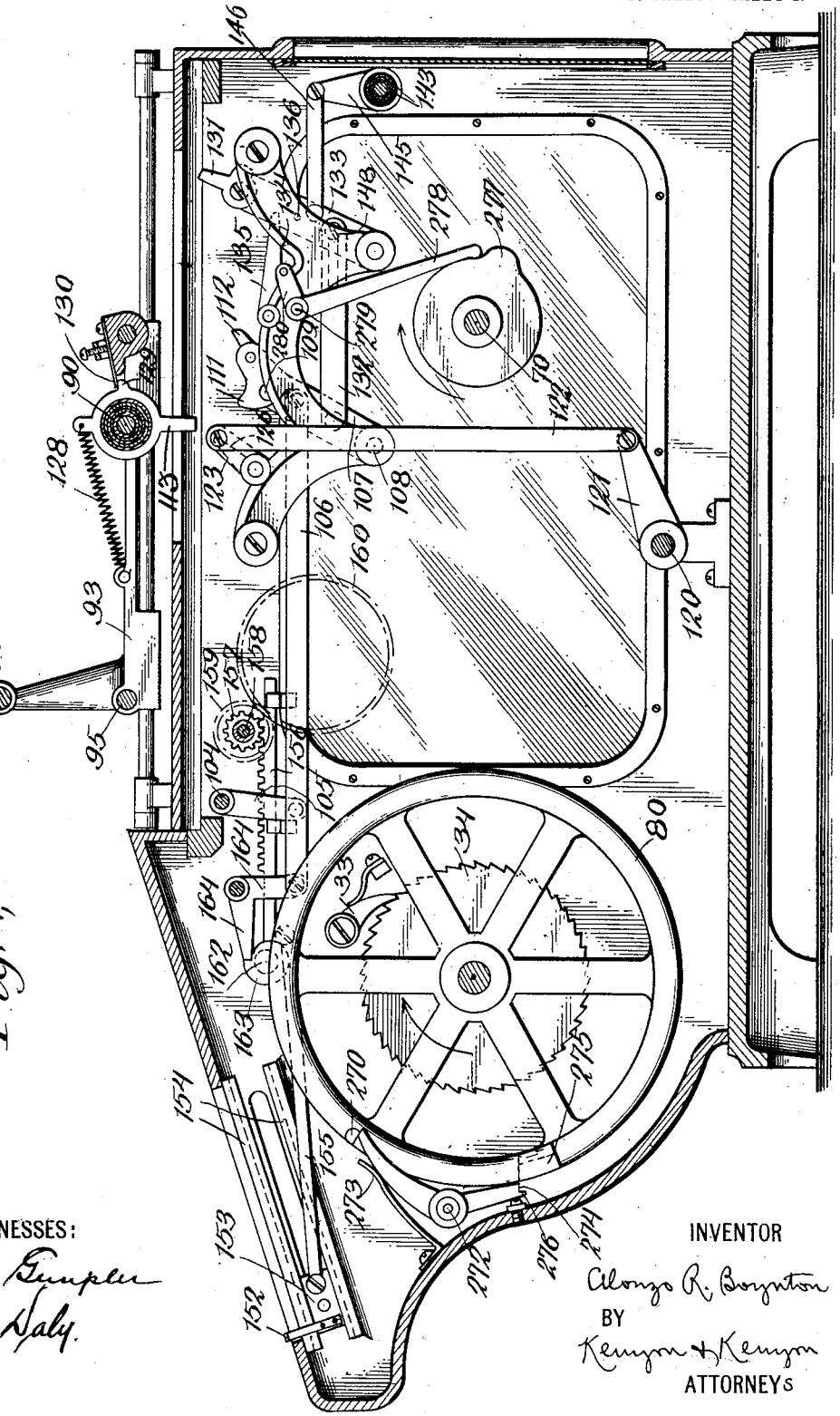

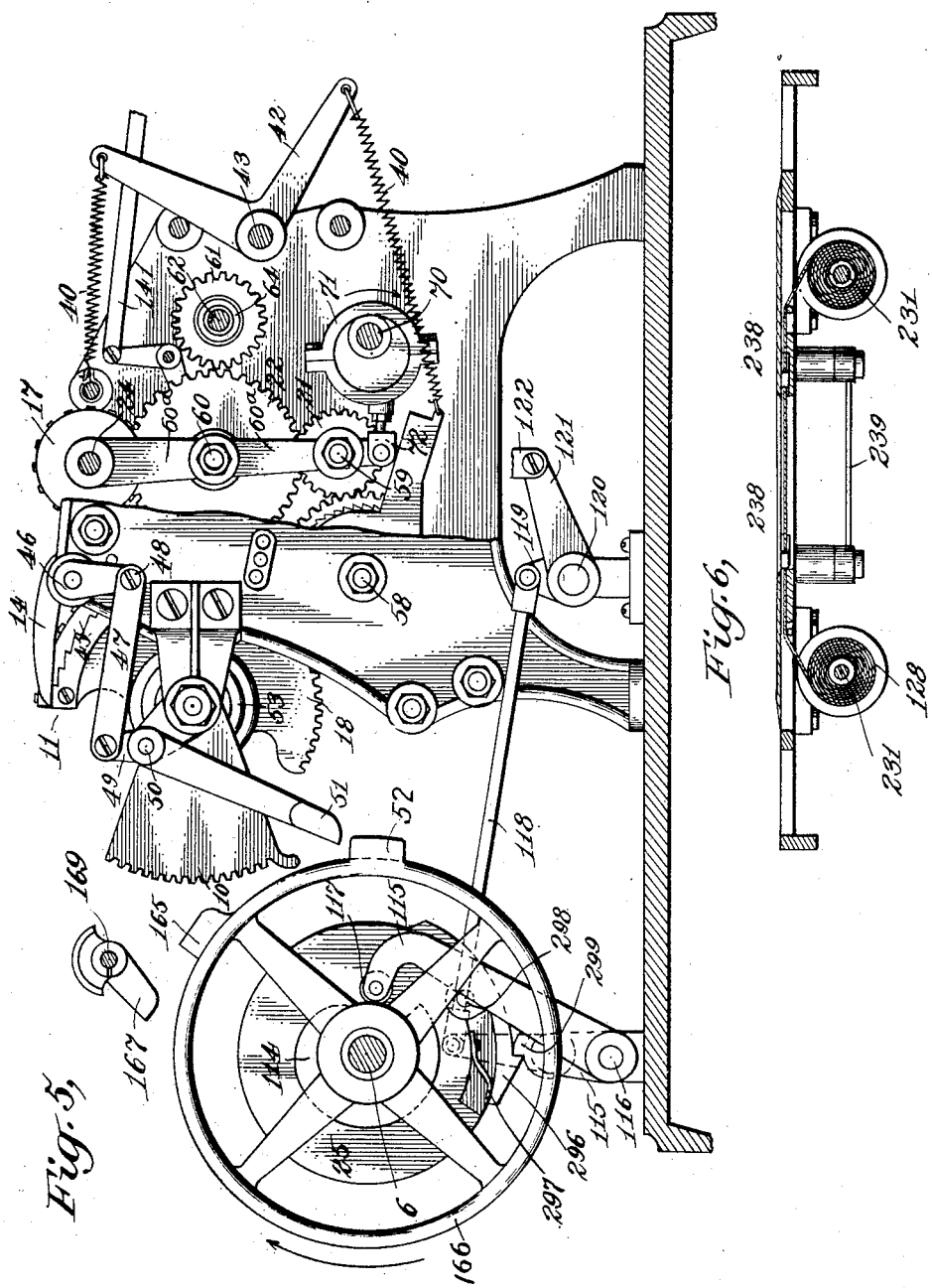

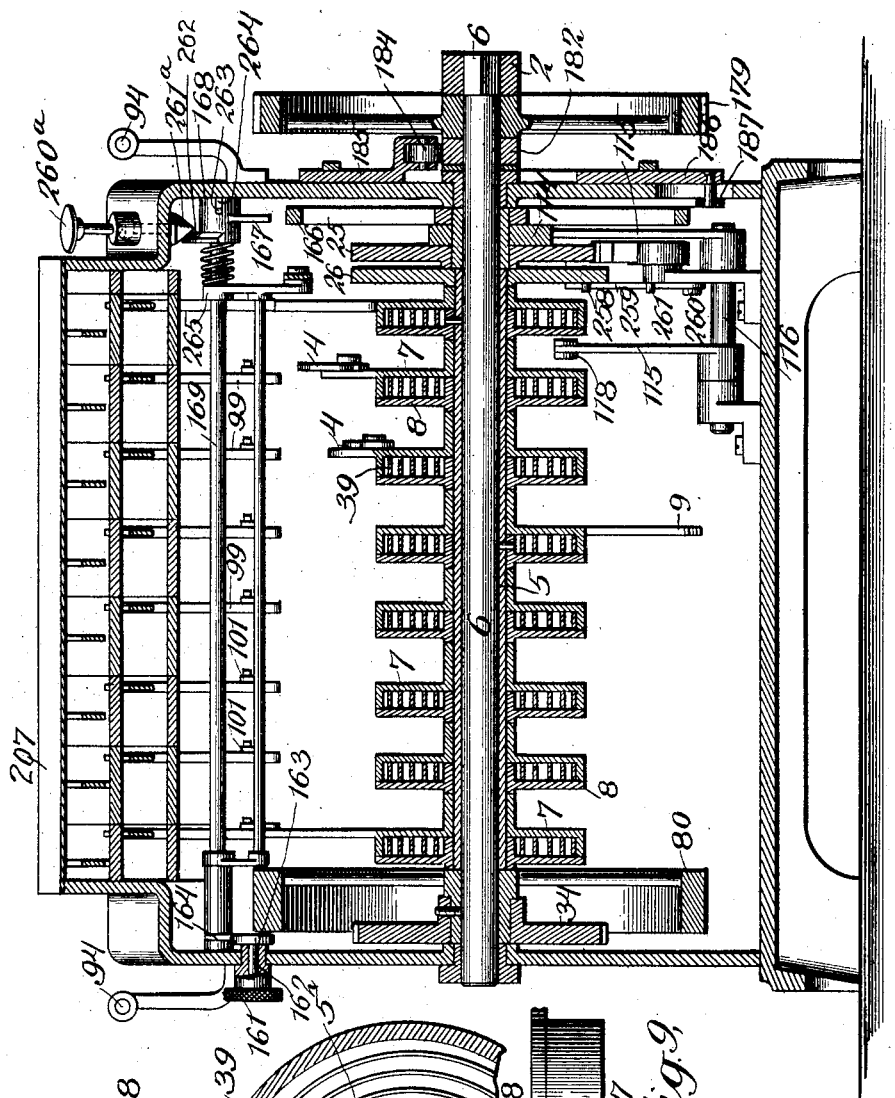

No. 745,145. PATENTED NOV. 24, 1903.
A. R. BOYNTON.
PRINTING MACHINE.
APPLICATION FILED OCT. 23, 1902.
NO MODEL. 15 SHEETS—SHEET 7.
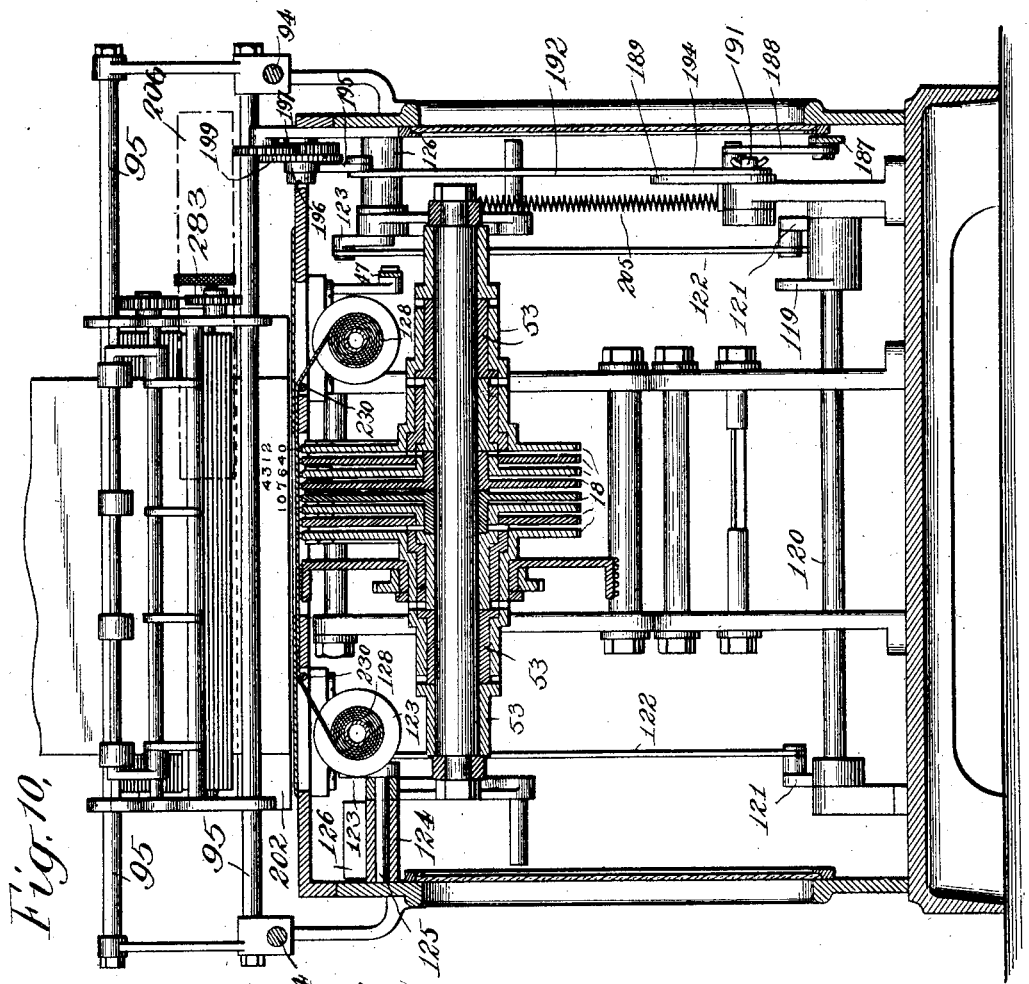
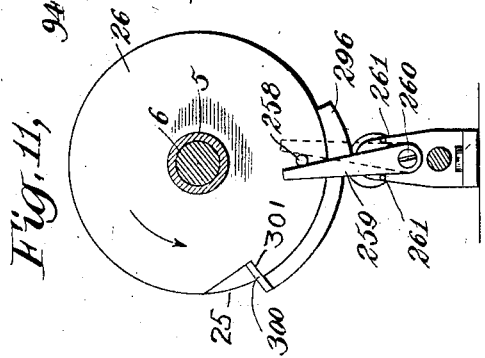
WITNESSES:
INVENTOR
Alonzo R. Boynton
BY
Kenyon & Kenyon
ATTORNEYS No. 745,145. PATENTED NOV. 24, 1903.
A. R. BOYNTON.
PRINTING MACHINE.
APPLICATION FILED OCT. 23, 1902
NO MODEL. 15 SHEETS—SHEET 8.
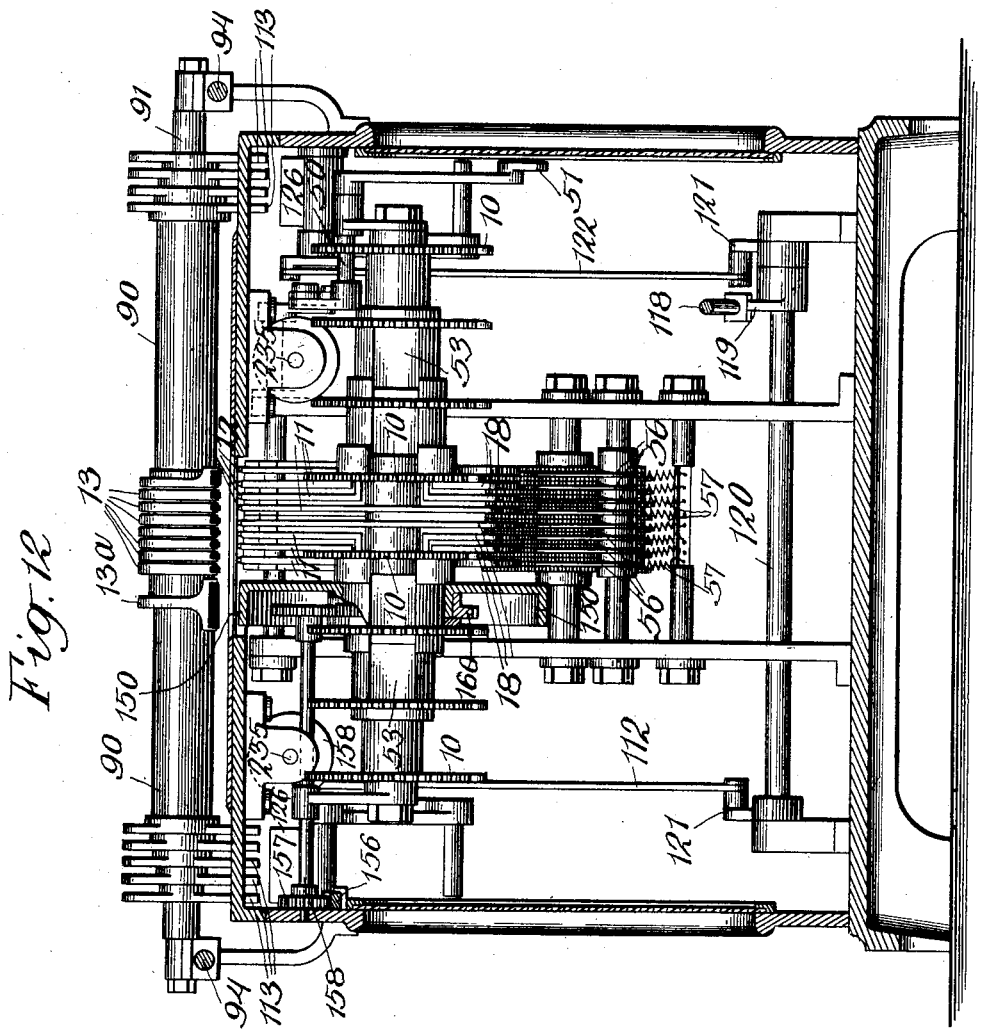

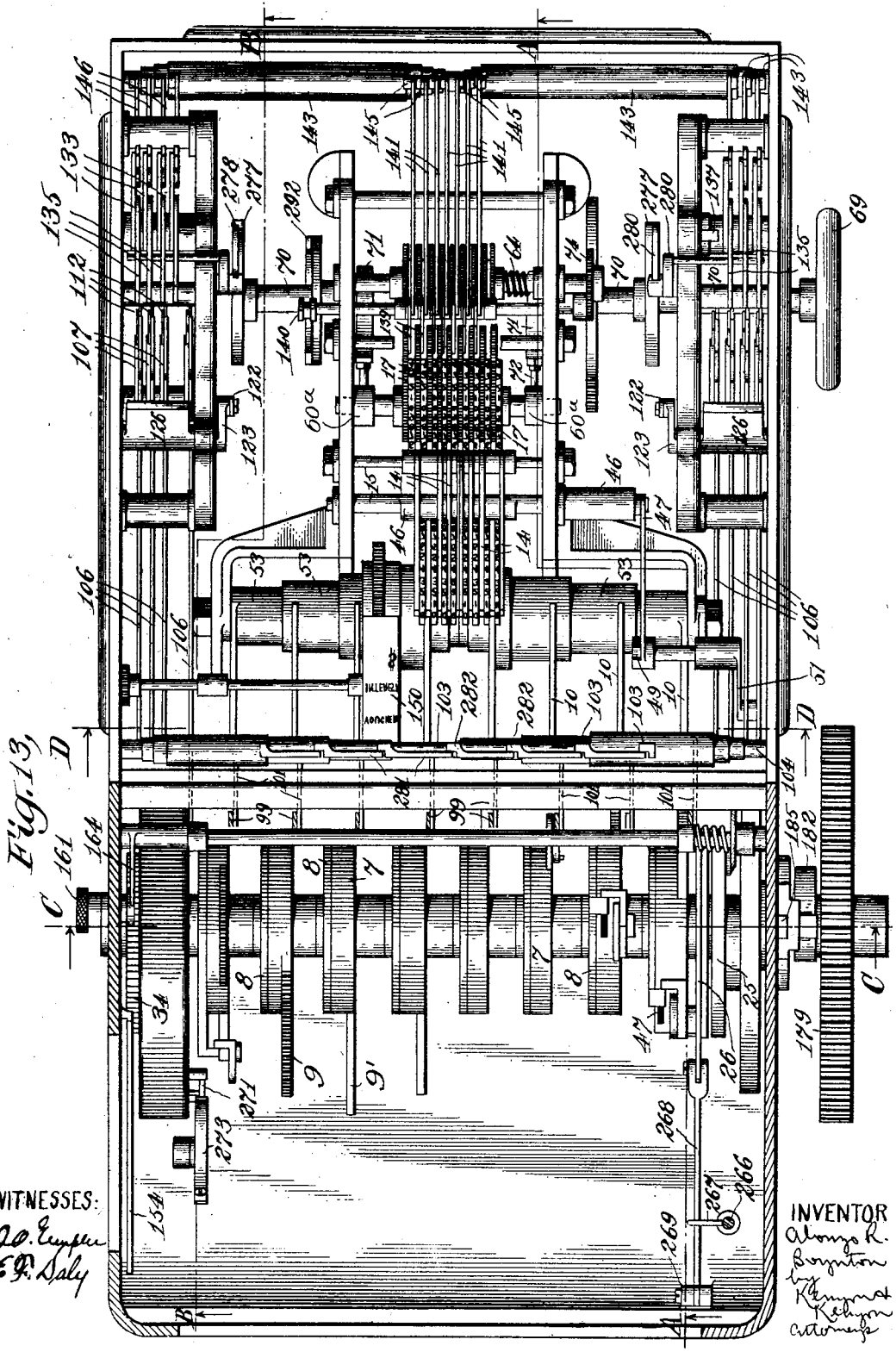

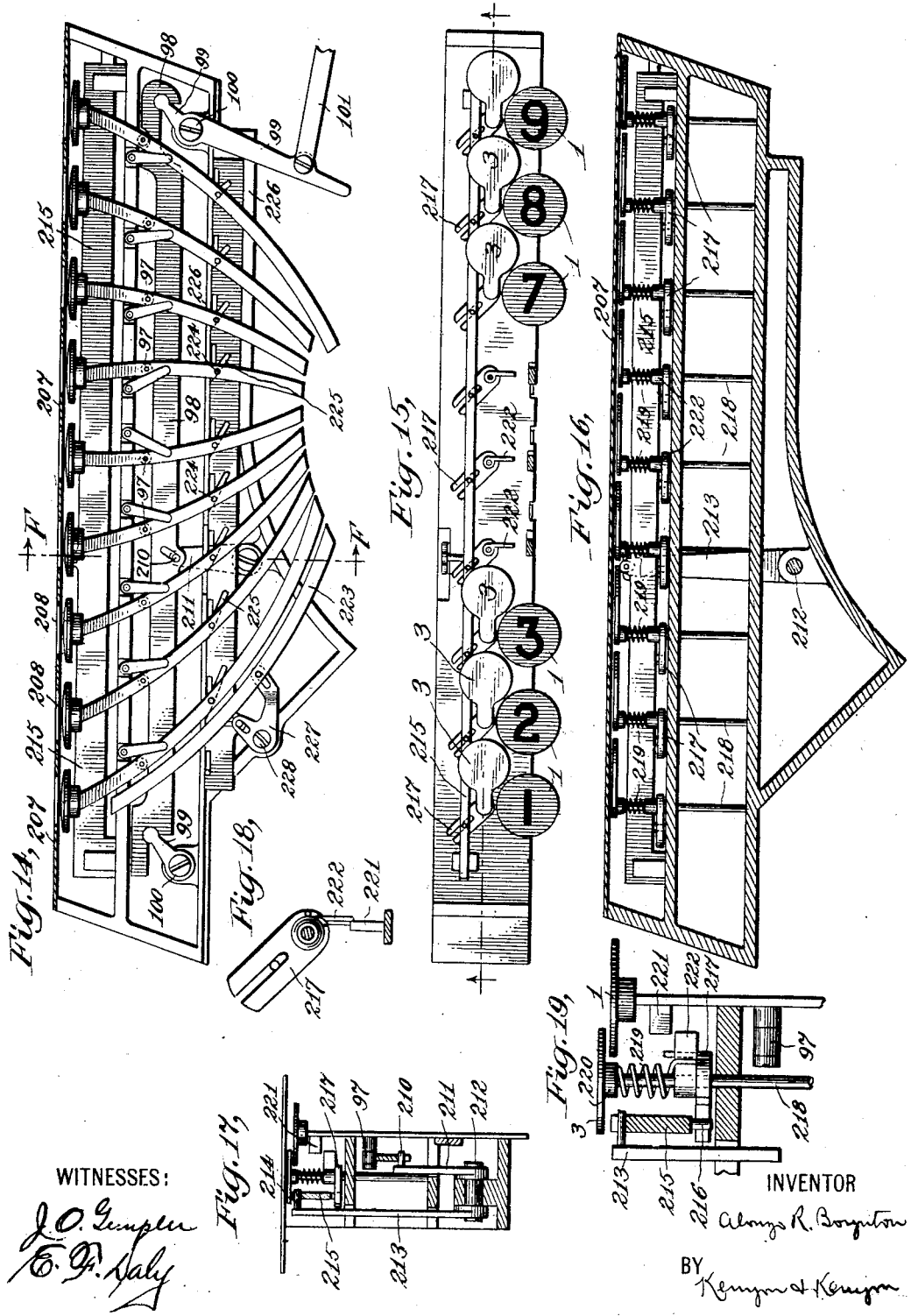

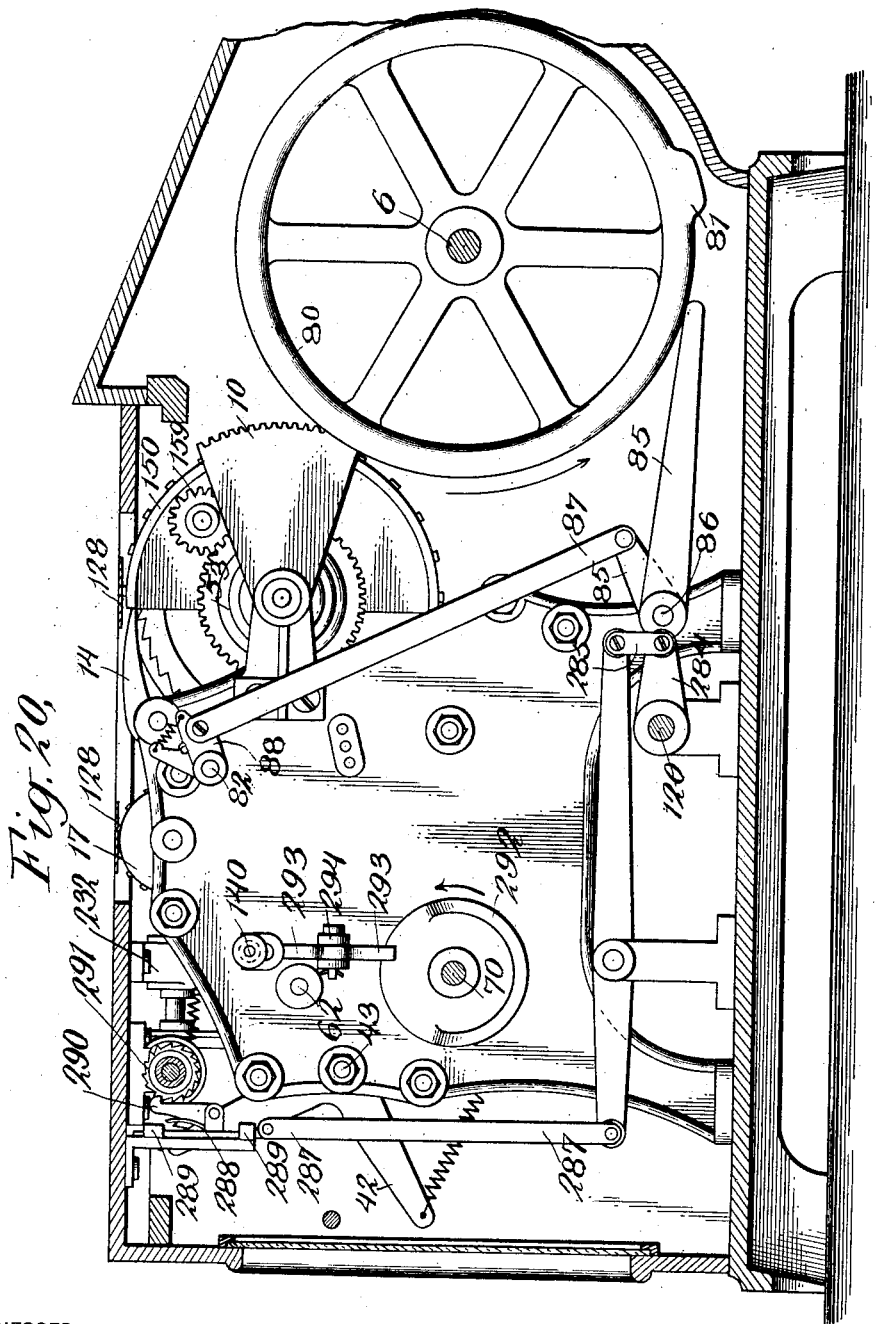

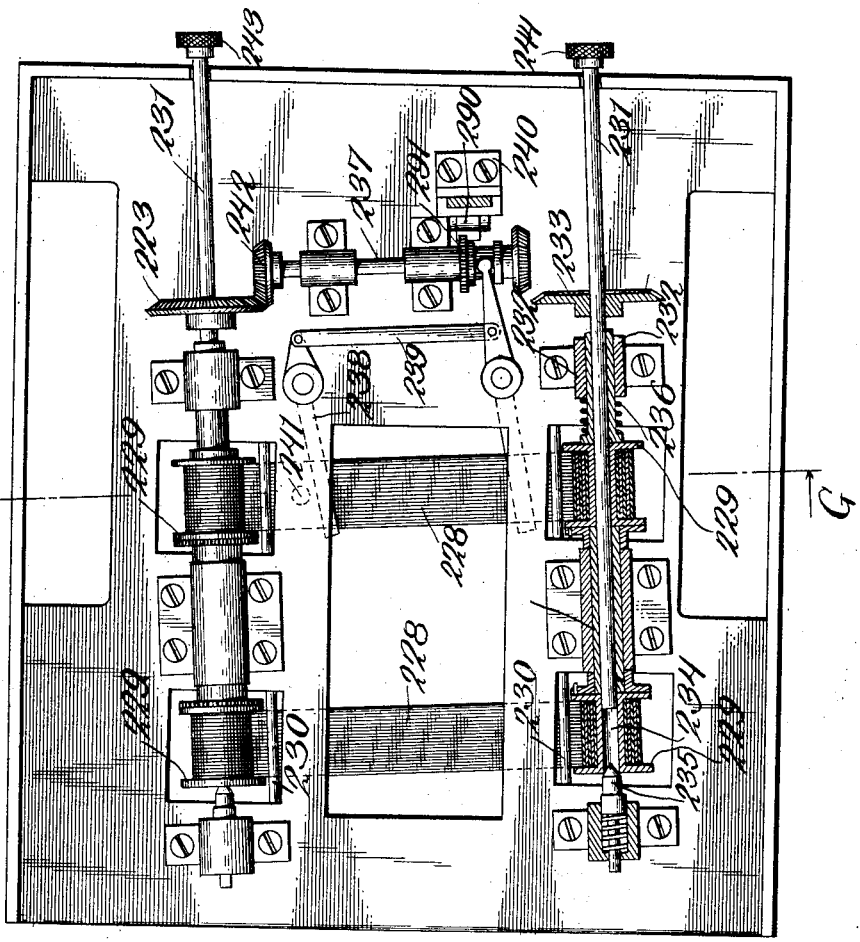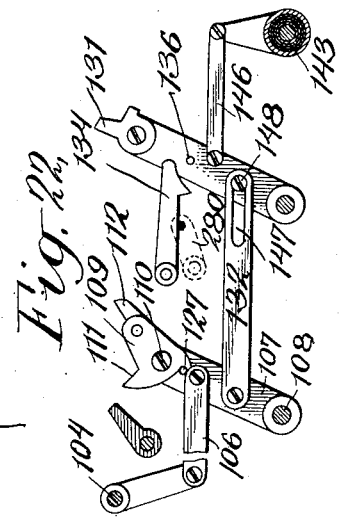

No. 745,145. PATENTED NOV. 24, 1903.
A. R. BOYNTON.
PRINTING MACHINE.
APPLICATION FILED OCT. 23, 1902.
NO MODEL. 15 SHEETS—SHEET 13.
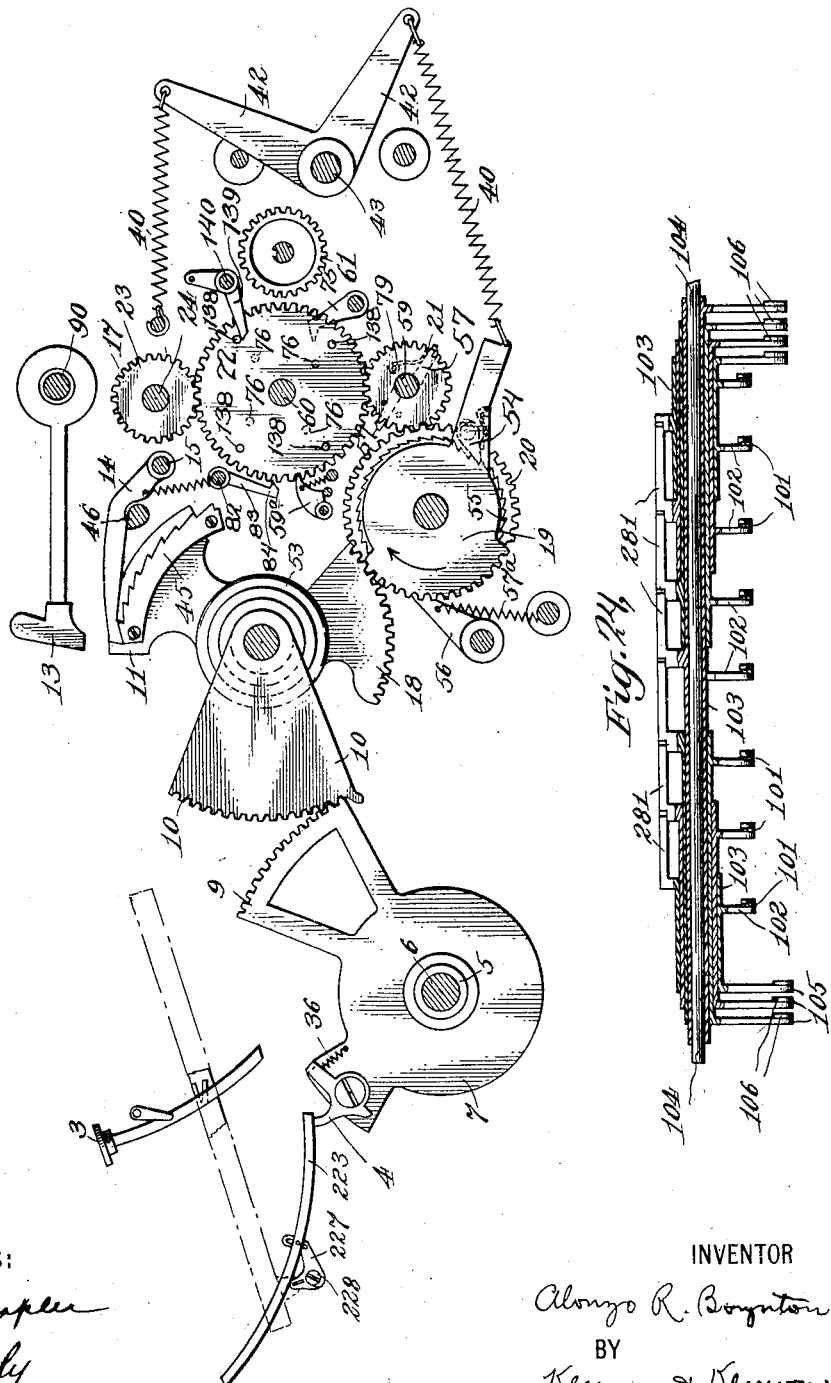
WITNESSES:
INVENTOR
Alonzo R. Boynton
BY
Kenyon & Kenyon
ATTORNEYS No. 745,145. PATENTED NOV. 24, 1903.
A. R. BOYNTON.
PRINTING MACHINE.
APPLICATION FILED OCT. 23, 1902.
NO MODEL. 15 SHEETS—SHEET 14.
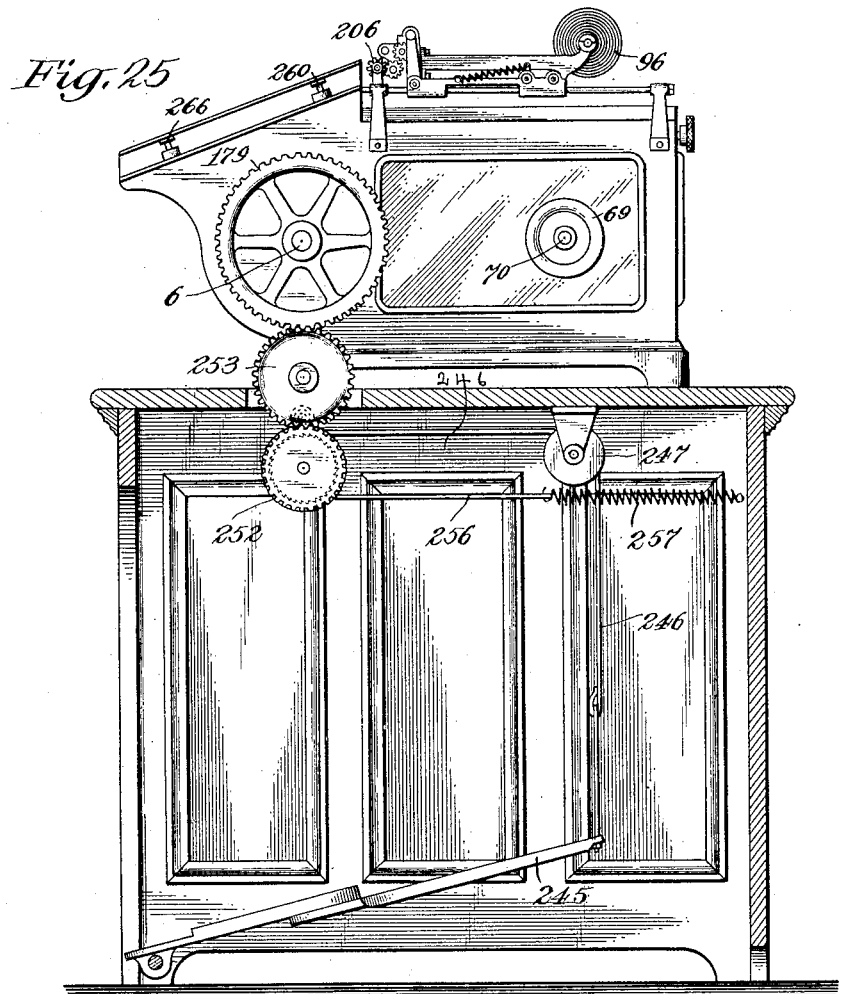
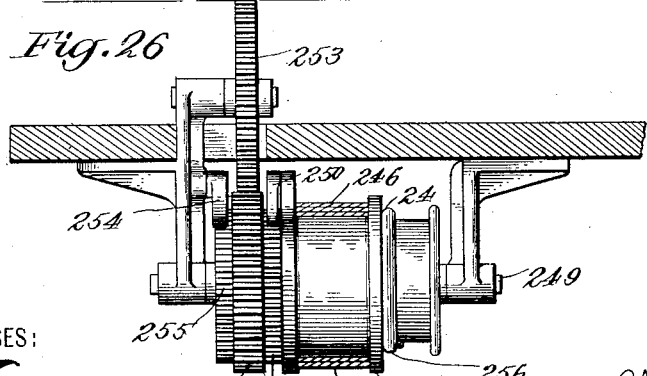
WITNESSES:
INVENTOR
Alonzo R. Boynton
BY
Kenyon & Kenyon
ATTORNEYS No. 745,145. PATENTED NOV. 24, 1903.
A. R. BOYNTON.
PRINTING MACHINE.
APPLICATION FILED OCT. 23, 1902.
NO MODEL. 15 SHEETS—SHEET 15.
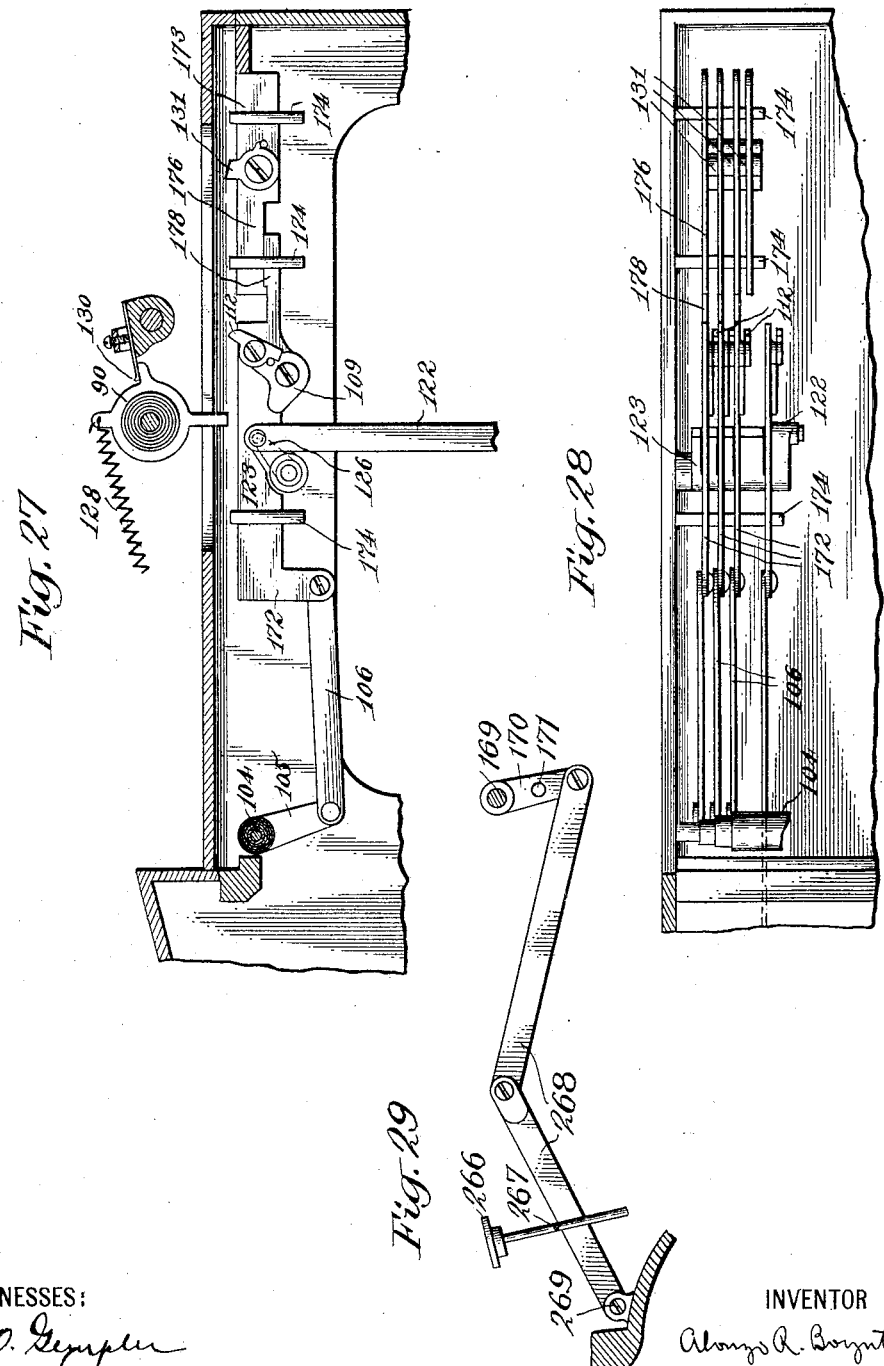
WITNESSES:
INVENTOR
Alonzo R. Boynton
BY
Kenyon & Kenyon
ATTORNEYS

No. 745,145. Patented November 24, 1903.

UNITED STATES PATENT OFFICE.

ALONZO R. BOYNTON, OF BINGHAMTON, NEW YORK, ASSIGNOR TO BUNDY MANUFACTURING COMPANY, A CORPORATION OF NEW YORK.

PRINTING-MACHINE.

SPECIFICATION forming part of Letters Patent No. 745,145, dated November 24, 1903.

Original application filed May 6, 1902, Serial No. 106,169. Divided and this application filed October 23, 1902. Serial No. 128,476. (No model.)

*To all whom it may concern:*

Be it known that I, ALONZO R. BOYNTON, a citizen of the United States, and a resident of Binghamton, in the county of Broome and State of New York, have invented certain new and useful Improvements in Printing-Machines, of which the following is a specification.

My invention relates to printing-machines and to machines for bringing suitable characters upon a printing or reading line. It has for its object to improve and simplify such machines, to make them more certain and accurate in operation, and, generally, to improve the construction and mode of operation of such machines; also, to prevent any operation of the machine unless one or more keys are struck; also, to provide improved means for driving such machines; also, to make the action of the main shaft of the machine steadier and less likely to vibrate or wabble; also, to provide an improved means for nesting the type-wheels together, so as to provide ample room for the keys and connecting parts and yet cause the printing-type to be compact and close together; also, to provide individual hammers for the different orders or numbers or other characters and simple and efficient means for placing them in set position ready for operation and improved means for operating them; also, to provide simple and efficient means for printing the numbers or characters and means that can be readily operated; also, to improve the paper-feed and ribbon-feed mechanism of machines of this character; also, to provide means for printing suitable words alongside of the numbers that are set up in the printing-line and to print such numbers; also, to provide improved means for stopping the driving parts of the machine at the end of each complete operation; also, immediately after the printing of each number set up upon the keys to bring the number thus printed into sight, so that any error can be instantly detected; also, to provide means for causing the triggers for the hammers of all lower orders to be set up when a key of a higher order is struck.

My improvement is shown in the drawings accompanying this specification and forming a part hereof in connection with a printing and adding machine adapted for bringing numbers mounted upon suitable type-wheels upon a printing or reading line and in connection therewith for adding the numbers from time to time set up upon the machine. It can be used, however, in part, at least, in machines in which other characters than numbers are used and in which the characters are set up either for printing or reading purposes. The adding part of the mechanism shown in the accompanying drawings and described herein is not claimed herein, as it is claimed in another application of mine heretofore filed—to wit, my application, Serial No. 106,169, for calculating-machines, filed May 6, 1902, of which the present is a divisional application.

In the accompanying drawings I have shown and will now proceed to describe a machine which embodies my invention in its preferred form.

Figure 2:
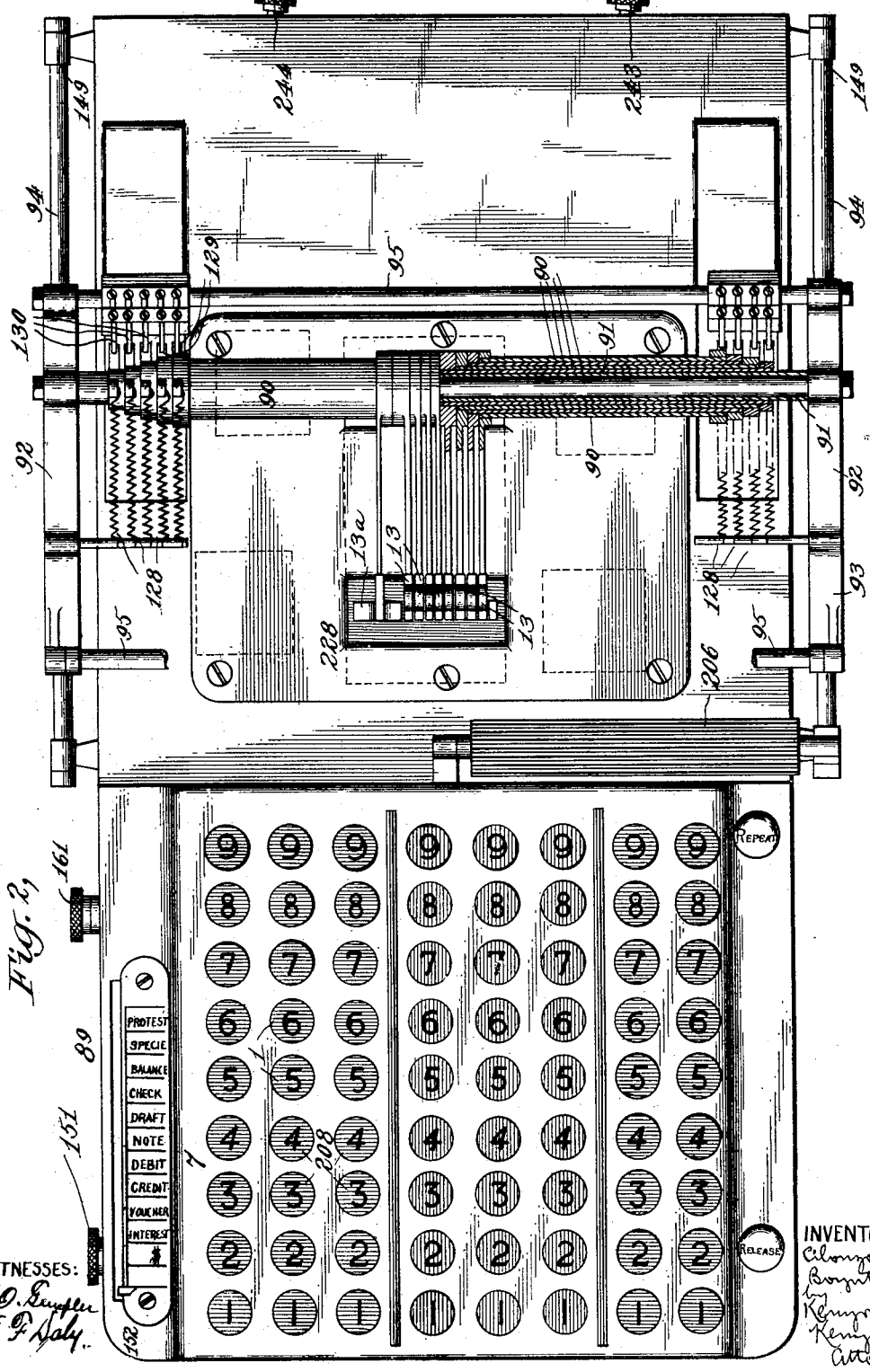

Referring now to the specific embodiment of my invention shown in the drawings, Figure 1 is a side elevation of such a machine with part of the casing removed. Fig. 2 is a horizontal view, partly in section, through the hammer-sleeves. Fig. 3 is a vertical longitudinal section taken on the lines A A of Fig. 13 viewed as shown by the arrow. Fig. 4 is a vertical longitudinal section taken on the lines B B of Fig. 13. Fig. 5 is a side elevation of parts of the machine. Fig. 6 is a detail of the ink-ribbon-feeding device. Fig. 7 is a vertical cross-section taken on the lines C C of Fig. 13. Figs. 8 and 9 are details of the wheels mounted on sleeve 5. Fig. 10 is a vertical cross-section taken through the sleeves of the type-wheels on the lines E E of Fig. 3. Fig. 11 is a detail of the stop mechanism. Fig. 12 is a vertical cross-section taken on the lines D D of Fig. 13. Fig. 13 is a plan of the machine with the carriage and keys and connecting parts removed. Figs. 14 to 19, inclusive, are details of the keys and screens and their connecting parts, Fig. 17 being a detail taken on the lines F F of Fig. 14. Fig. 20 is a side elevation of certain of the parts of the machine. Fig. 21 is a detail of the ink-ribbon-feeding mechanism. Fig.

22 is a detail of the hammer-triggers. Fig. 23 is a diagrammatic view illustrative of the general operation of the machine. Fig. 24 is a vertical section through the sleeves which operate the hammer-triggers. Figs. 25 and 26 are modifications showing means for driving the machine by foot-power. Figs. 27 and 28 show a modification of the hammer-triggers. Fig. 29 is a detail of the release-key and its connecting mechanism.

Before proceeding to describe in detail the embodiment of my invention shown in the drawings I will for the purpose of clearness first briefly describe the work done by that machine, referring in this connection more particularly to Figs. 1, 2, 3, 7, 13, 14, 15, and 23. My said machine shown in the drawings is provided with keys 1, arranged in series, preferably a bank of keys consisting of a plurality of series of keys arranged in the usual way, the two series at the right hand of Fig. 2 representing cents and those to the left representing dollars. The machine is operated by depressing the keys corresponding to the number it is desired to set up on the reading or printing line or to add, and by turning a crank 2 (shown in Fig. 1) one complete revolution the rest of the work is done automatically by the machine. Each key as it is depressed is locked in its set position, and as it is thus operated it causes a screen 3 to be moved over every other key of its series, thus preventing the striking of any other key of that series and enabling the operator when it has set up a number to see at a glance whether it is correct or not. The means by which these various steps are effected will be described later on in detail. As each key is moved into its set position the lower end of its shaft is depressed into a path of a projection 4 from one of a set of wheels arranged upon a sleeve 5, secured to a shaft 6, upon which shaft crank 2 is mounted and by which it and sleeve 5 and the wheels carried by it are rotated. One of these wheels, carrying projection 4, is shown at 7, Fig. 27. As many wheels 7 are provided upon a sleeve 5 as there are series of keys. Each wheel is composed in the form shown in the drawings of two parts, one part 8, which is fast to sleeve 5, and the part 7, which is loosely mounted upon said sleeve. When shaft 6 rotates as crank 2 is turned, the fast parts 8 of these wheels cause the loose parts 7 to rotate. This is done by means of a detachable lock, presently to be described, which at times connects parts 8 and 7 together and which at other times frees them. Normally the lock connects parts 7 and 8 together. As shaft 6 rotates projecting portion 4 of the loose part 7 of the wheel strikes against the stop by the inner end of the depressed key of the corresponding series. This causes the detachable lock, connecting parts 7 and 8, to free these parts, disconnecting them from each other and permitting part 8 to rotate onward with sleeve 5 and crank 2, while the loose part 7 is held against the stop of the key. Of course the distance traversed by wheel 7 before it comes to stop depends upon which one of the series is depressed—key 9, for example, allowing a farther rotation than any lower key. Teeth 9 upon a segment of wheel 7 mesh with teeth 10 upon a segment of type-wheel 11, the latter carrying type 12, adapted to be brought upon a printing-line immediately below hammers 13 as type-wheel 11 is rotated. One type-wheel 11 is provided for each series of keys. The particular type upon a type-wheel brought upon the printing-line at any time will of course be dependent upon the particular key depressed in the corresponding series of the keys. The type-wheels 11 are held in set position by a series of spring-pressed pawls 14 upon a shaft 15. A strip of paper 16 is passed below hammers 13 and above the type 12, upon which at the proper time the numbers are printed. By depressing one of these keys and turning crank 2 a number composed of the digits corresponding with those of the depressed keys will be brought upon the printing-line and will be printed upon the paper.

As the paper is fed forward immediately after the printing is effected the number printed comes into a position where it can be seen by the operator and any error can at once be detected. At the same time and by the same operation the number thus set up will be added to the total-adding wheels 17. There is, of course, one of these wheels for each series of keys and in addition thereto one or two or three extra ones in the totals. In the drawings I have shown one extra adding-wheel. The motion is transmitted from type-wheels 11 through teeth 18 to the total-adding wheels through a series of reciprocating toothed segments 19 and transferring adding-wheels 20 21 22 and gear 23 on the shaft 24 of the total-adding wheels, suitable pawls being employed to prevent backward rotation of the parts and suitable mechanism for carrying from one to the next higher-wheel. In this way each number that is set up upon the printing or reading line is also added to the numbers on the adding-line or the type-line of the adding-wheels 17. A printed impression of this total may be obtained at any time, as will be presently described.

All of the details of the adding part of the machine are not given, as such form, as previously stated by me, no part of my present invention.

In the course of rotating crank 2 the impression mechanism of the number set up is automatically actuated and the paper and ink-ribbon used in the printing are automatically fed forward, and then the type-wheels and the wheels upon the sleeve of the main shaft, the sleeve itself, and the keys are all released and returned to their normal positions. All of these operations are performed by a rotation of crank 2 in one direction only and in a complete revolution of the crank.

Any suitable mechanism for resetting the total-adding wheels at any desired time may be employed.

I will now proceed to describe more in detail each of the parts and operations referred to above in a general way and also certain other features of my improvements not hereinbefore specifically alluded to.

*The keys and their connecting mechanism.*—These are illustrated in Figs. 3, 14 to 19. I prefer to arrange the keys so that they are seen and will be struck through openings or apertures in a protecting covering or casing. As shown, 207 is a protecting plate or covering extending over the bank of keys and provided with openings or apertures 208, through which the keys can be seen and struck. I also preferably provide a series of screens 3, one for each key, and so arrange them that whenever a key of the series is struck the screens for all of the other keys will be moved over those keys; but the screen of the key which is struck will not be moved into screening position, so that the only key of the series that will appear is the one that has been struck. In this way after setting up any number upon the bank of keys the operator can tell at a glance whether he has set up the right number. He is also prevented from striking two keys of a series. For this purpose I provide a common actuating part adapted to be moved by each key of the series as it is depressed and connect such common actuating part with all of the screens of the series to move them into and out of their positions over the keys. I also provide a stop, which is thrown into position when a key is operated to prevent its particular screen from being moved. In order to accomplish this and yet to move the other screens, the common actuating part is connected with each screen by a flexible or elastic connection, which will be sufficient to impart motion from the common actuating part to the screen to move it except when a positive stop is thrown by a particular key into the path of movement of its screen. Many different devices may of course be used for these purposes. The particular form of devices shown in the drawings consists of the following: The stem of each key is provided with a horizontal stud carrying a roller 97, resting upon a bar 98, which runs across under all of the keys of its series, as has been already described. As bar 98 is swung to the right, as shown in Fig. 14, as a key is depressed, it strikes against the pin 210, which projects from the side of the arm 211, fast on rock-shaft 212, as shown in Fig. 17. This rock-shaft carries another arm 213, which is also provided with a pin 214, projecting from its side and entering a recess in bar 215, (shown also in Fig. 14,) which stretches the length of the series of keys. Bar 215 is moved to the right, as viewed in Fig. 14, as a key is depressed. This bar is provided with a series of pins 216, each one of which engages with a rocking piece 217, loosely mounted upon the stud 218, carrying at its head a screen 3. Rocking piece 217 is flexibly or elastically connected with screen 3 or its stem 218 by means of a spring 219, which is secured at its lower end to piece 217 and at its upper end to a collar 220, fast on stem 218. As the key is depressed piece 217 is rocked on the stem 218 and through spring 219 swings screen 3 over its key. This takes place with every screen of the series except that of the key which is depressed. To prevent this operation in the latter case, I provide a stop 221, mounted on the stem of the key, which immediately upon the starting downward of the key is thrown into engagement with a stop 222, fast upon stem 218, preventing rotation of the stem and its screen 2. It will of course be understood that each series of keys is provided with similar apparatus.

In order to prevent any setting up of any number on the printing-line or in adding unless a key is depressed, I provide a series of stops 223, one for each series of keys. These are shown at the left in Fig. 14 in their depressed or stop positions. Should the crank be rotated, the projections 4 from the wheels 7 would be held by these stops 223 in the position shown in Fig. 23 before type-wheels 11 had begun to move. If there were no such stops provided and the operator should move the crank-arm without first depressing a key, numbers 29 would be set up on the printing-line and would be added. The depression of the key automatically withdraws stop 223 of the series from its operative position. As shown, this is done in the following way: The stem of each key of the series has a pin 224 projecting from the side of the stem and normally directly over an inclined slot 225 in a locking-bar 226, which also runs across the machine, as shown in Fig. 14. When a key is depressed, pin 224 forces bar 226 to the left. This moves all of the other slots from under their respective pins 224 and locks every other key of the series in position. It also throws upward and to the left a bell-crank 227, pivoted in the framework at 228 and secured by one arm to the bar 226 and by the other arm to stop 223 by means of a pin and slot, as shown in Fig. 14. When the keys are returned to their normal position, locking-bar 226 is moved to the right, throwing stop 223 down to its operative position.

*The main shaft, its sleeve and wheels, and connecting parts.*—These are illustrated especially in Figs. 1, 3, 5, 7, 8, 13, and 23. Crank 2 is securely mounted upon main driving-shaft 6, which runs clear across the machine, as shown in Fig. 7, and upon it is mounted sleeve 5, which carries the wheels 7 and 8. Crank 2 on shaft 6 is always rotated in the same direction. Sleeve 5 is arranged to have a reciprocating motion upon shaft 6, moving in one direction with its wheels to bring the desired characters upon the printing-line and in the other direction at the close of the entire operation and when crank 2 has substantially reached the end of a complete revolution. The shaft and sleeve are connected together by a detachable lock, which is adapted in one position to lock them together to move the sleeve in one direction as the crank is rotated and in the other direction to unlock them to permit the sleeve to return to its normal position by means of springs, as shown. The detachable locks and their connections are as follows: Fixedly mounted upon shaft 6 is a disk 25, and similarly mounted upon sleeve 5 is a disk 26. Disk 25 has pivoted to it a locking lever or piece 296, (see Figs. 5 and 11,) having a lug 300, which projects sidewise from disk 25 and over a cut-away portion of disk 26, forming a shoulder 301. (Shown in Fig. 11.) In this normal position of the parts motion is transmitted from shaft 6 and disk 25 through locking-piece 296 and lug 300 and shoulder 301 to disk 26 and sleeve 5 and to the wheels thereon, to be presently described. When crank 2 has nearly made a full revolution and the printing or adding has been completed, the end of locking-piece 296 passes over a cam 299, secured to the framework of the machine, and is pressed upward, lifting the lug out of the engagement with the shoulder. Sleeve 5 is then free to return to its original position and is moved backward through its parts in the manner presently to be described.

By means of the above-described construction crank 2 can be rotated in the same way at all times and the reciprocating rocking motion necessary to permit type-setting can still be obtained. By making shaft 6 long and running it across the machine and by making the parts carrying the wheels in the form of a sleeve mounted upon it I am enabled to give a long bearing-surface to both parts, thus insuring a steady regular action of the parts, free from wabbling or irregularity or jerking, and I am also enabled to make the parts strong and durable and increase the efficiency of the connection between them. Both the crank and its shaft and the sleeve run true and regular and are free from any irregular sidewise wabbling motion.

Backward rotation of shaft 6 is prevented by means of a pawl and ratchet in the usual way. Upon the sleeve are mounted a number of wheels, one for each series of keys, to transfer the motion of the shaft to the typewheels, bringing the proper characters upon the reading or adding line. These wheels are composed of two parts, one part, 8, fixedly connected to sleeve 5 and the other part, 7, mounted loosely thereon. I provide a detachable lock which is adapted to connect the two parts together to cause the fast part to rotate the loose part a certain distance, whereupon the lock is operated automatically to disconnect them to permit the loose part to stop while the fast part rotates onward with the shaft. As shown in Fig. 9, this detachable lock consists of a swinging piece 35, pivoted to loose part 7 of the wheel and normally held by a spring 36 in the position shown in Fig. 23. Swinging piece 35 has a projecting knob 4, adapted to strike the lower part of the stem or shaft of the key when depressed, and it has also a lug 37, adapted normally to lie over a shoulder 38 on the fast part 8 of the wheel. In this position of the shoulder and lug the fast part will rotate the loose part as the main shaft is rotated until the knob 4 strikes against a stop formed by the inner end of a key. This tips piece 35, throwing lug 37 out of engagement with shoulder 38, whereupon fast part 8 of the wheel is rotated by the shaft and the crank further on. The distance that the loose part of the shaft rotates is of course dependent upon which one of its series of keys is depressed. Through the teeth 9 of a segment on part 7, meshing with teeth 10 on type-wheel 11, the type-wheel is rotated a similar distance, bringing that one of type 12 upon the printing-line which corresponds with the number of the key which has been depressed. In this way I provide a plurality of wheels arranged upon sleeve 5, the number of wheels corresponding with the number of series of keys, and each wheel is sufficiently independent of all the other wheels to be able to travel its own distance irrespective of that traveled by the other wheels, enabling each wheel to bring its printed number upon the proper line.

A spring 39 connects the fast and loose parts of each wheel together and insures that the loose part 7 will be held snugly with its knob 4 against the stem of the depressed key during the printing and adding operation. As is shown, spring 39 is arranged between the parts of the wheel.

When sleeve 5 is released from its connection with shaft 6, it is returned to its original position by means of a series of springs 40, connecting with segments 19. In these springs 40 are also ended in part by the action of springs 39. These springs had been strained during the forward movements of the parts and at the close return segments 19, typewheels 11, fast part of the wheel 8, and the sleeve all to their original position. In the backward movement of the fast parts 8 shoulder 38 strikes against a rubber buffer 41, secured to the loose part 7 of the same wheel, which buffer diminishes the effect of the blow, if any. The contact of the buffer with the shoulder tends in some cases to aid in carrying the loose part back to its original position.

Shaft 6, sleeve 5, and the fast and loose parts of the wheels are all so arranged with their springs 40 that immediately upon the commencement of rotation in the regular operation of the machine shaft 6, sleeve 5, and the first one of the fast and loose wheels 8 and 7 immediately begin their forward movement, and one spring 40 is immediately put under strain. In the continued rotation of shaft 6 one after the other of the remaining springs are put under strain successively. On the return movement of the parts the spring 40 that has been last put under strain in the forward movement comes to its normal position first and then the remaining springs in order until the one first put under strain reaches its normal position, by which time the parts have all been returned to their normal positions. The springs 40 thus insure the return of the loose parts of the wheels to their original positions, in which they are aided in part by some of the springs 39, and the springs 39 insure that the fast parts of the wheels and the sleeve are returned to the loose parts, thus bringing all of the parts back to their original positions.

The entire operation of the sleeve and its wheels on their forward and return movements is as follows: Upon the commencement of the rotation of shaft 6 sleeve 5 and the fast parts of the wheels start moving at once, carrying with them the loose parts until the latter are stopped, in the manner above described, at different points through the action of the keys. Immediately upon the commencement of this movement the gear 9 upon the first loose wheel starts to move its type-wheel 11 and immediately begins to strain its spring 40. The different loose wheels successively engage with their corresponding type-wheels, thus successively straining their corresponding springs 40. When the type-wheels are released, all of the springs 40 that have been strained immediately move their corresponding loose wheels backward until these loose wheels are out of engagement with the gear 10, connected with the type-wheels. Thus one by one springs 40 cease to act. Meanwhile the springs 39, that have been strained on the forward movement of the parts whenever a fast part of a wheel separated from its corresponding loose wheel, tend to return the fast parts, and along with them the sleeve, until the fast part of each wheel has caught up in the return movement with the loose part of the wheel. The springs 40 thus tend to return not only the loose parts but also the fast parts of the wheels and the sleeve 5 to their original position, these springs, however, being thrown out of operation one by one until at last only one set of springs is in operation—namely, the one first strained. This set remains strained, however, until its loose wheel has been returned to its original position, and thus through the action of the springs 39 and the buffers 41, making contact with the shoulders 38 on the other loose wheels, completes the return movement of all of the fast and loose wheels and the sleeve 5 to their original positions.

In order to equalize the pressure upon the crank and shaft and sleeve throughout their rotation, the wheels and the segments of the type-wheels which mesh with the loose parts of the gear-bearing segments of the loose parts of the wheels are arranged in echelon, as shown in Fig. 3. By these means the work of rotating the different parts is distributed in equal parts throughout the rotation of the crank, and the work of returning the segments, type-wheels, sleeve, and its wheels is taken up in turn by each set of springs 40. The two springs 40 of each set are connected by a bell-crank 42, pivoted to 43, merely to insure a better spring action.

*Type-wheels among their locking-pawls and their releasing mechanism.*—These devices are best illustrated in Figs. 3, 5, 7, 10, 12, 13, and 23. After the type-wheels 11 have been moved into their set position they are held in that position by a series of pawls 14, one for each type-wheel, and each pawl is loosely mounted upon a rod 15 and held by a spring 44 normally in engagement with the ratchet-teeth 45 of its type-wheel 11, holding these type-wheels in any position in which they are moved. These type-wheels are released from the action of the pawls by means of a releasing-bar 46 (shown as slightly pointed at one end in Fig. 23) and provided at one end with a fixedly-secured bell-crank arm 47, pivoted at 48. The free end of the bell-crank 47 is secured to bell-crank 49, pivoted at 50, as shown in Fig. 5, the other arm of the bell-crank carrying a toe 51, which is adapted at the very end of the rotation of crank 2 to be struck by a lug 52 on wheel 166, fast on shaft 6. This throws the toe of releasing-bar 46 upward, freeing the entire series of pawls 14 from ratchets 45. Thereupon springs 40 immediately restore the type-wheels, segments, sleeve 5, and connecting parts to their normal positions ready for the next operation.

In order to permit the use of keys of sufficient size to space them properly for practical use and to permit room for the wheels upon the sleeve of the main shaft, and yet to have the type 12 on the type-wheels 11 and the type on the total-adding wheels close together, so that they may be easily seen and read and may be printed compactly, the supports for the type-wheels are arranged in the form of hollow shafts nested within one another, as clearly shown in Figs. 10, 12, and 13, where the segments carrying the teeth 10 are shown as mounted each upon one end of a shaft 53, at the other or inner end of which is mounted the segment carrying the type 12. In order to use the number of series of type 12 on these type-wheels 11 shown in the drawings, I have found that these segments overlap two of the segments carrying the teeth 10. On this account I have arranged the pawls 14 so that the pawls of the outer segment on each side carrying the type 12 are arranged on the outer side of such segments, while the other pawls are all arranged on the inner side, as clearly shown on Figs. 10, 12, and 13. This arrangement leaves space between the outer and the next inner segment carrying the type 12, within which a segment carrying teeth 10 can move as it is rotated back and forth. By thus arranging the typewheels in the form of hollow and cut-away shafts and nesting them and by arranging the retaining-pawls in the manner above indicated I am enabled to make the printing-type and adding-type compact, while leaving plenty of room for the keys and the mechanism connecting them with the type-wheels. It will be of course understood that in the machine shown in the drawings the inner end of each sleeve 53 also carries a dependent segment that is provided with the teeth 18 for adding purposes, thus insuring that the total-adding wheels will also be compactly arranged.

*The adding-wheels and their carrying devices.*—While these form no part of my present invention, they are illustrated in part, especially in Figs. 3, 22, and 23, and will be briefly described. As above stated, a reciprocating motion is imparted from the type-wheels 11 through teeth 18 to segments 19. As each segment 19 moves in the direction of the arrow (shown in Fig. 23) a spring-pressed pawl 54 on each segment 19 engages with ratchet-teeth 55 on carrying-wheel 20 and rotates that wheel the number of teeth corresponding to the movement of type-wheel 11. A pawl 56 is held by spring 57$^a$ and engages with the gear-teeth, also secured to carrying-wheel 20, and prevents backward rotation. The gear of wheel 20 meshes with the gear of wheel 21. The latter by any suitable carrying mechanism carries to the next adjoining wheel 20 of the next higher order of digits at each ten-tooth movement of the wheel 20 of the next higher order. The details of this carrying mechanism are not shown, as they form no part of the present invention. As many wheels 20 are provided as there are type-wheels, and they are all loosely mounted upon shaft 58, and each of the wheels has a carrying-wheel 21, which wheels are loosely mounted upon shaft 59. Each wheel 21 except the one of the highest order is provided with suitable carrying mechanism. Each wheel 21 meshes with a corresponding wheel 22, a pawl 59$^a$ acting to prevent undue movement of the wheel. The transferring-wheels 22 are loosely mounted on shaft 60, and each meshes with a gearing-wheel 23, mounted on the shaft secured to one of the total-adding wheels 17. These wheels are mounted loosely on shaft 24. By these means the numbers set up in type 12 on the printing-line are added, the total appearing on the adding or printing line of the total-adding wheels 17. The devices for resetting the total-adding wheels are illustrated in part in Figs. 1, 3, 5, and 13; but as they form no part of the present invention they are not shown in full detail and will be but briefly referred to.

A resetting of the total-adding wheels is accomplished through resetting-wheel 61, mounted on shaft 62, into engagement with which resetting-wheels transferring-wheels 22 are brought when desired. For this purpose transferring-wheels 22 and carrying-wheels 21, with their shafts 60 and 59, are carried on a swinging frame 60$^a$, swinging freely from shaft 24. Transferring-wheels 22 are thrown into engagement with the resetting-wheels on the turning of resetting-wheel 69 on the outside of the machine through eccentric 71, mounted on the shaft 70 of wheel 69, connected by the link 72 to the bottom of the frame carrying wheels 22 and 21. Partial rotation of wheel 69 brings transferring-wheels 22 into engagement with resetting-wheels 61, and a further rotation of wheel 69 through a mutilated gear 73, mounted on shaft 70, meshing with gear 74 on shaft 62, turns the resetting-wheels and through them moves the total-adding wheels back to zero. All details of this mechanism are not given for the reason already set forth.

Stop 75 and pin 76 on the side of wheels 22 are provided to hold the total-adding wheels when they have reached the zero-point.

Cam 81 upon wheel 80 and bell-crank lever 85, operating by the said cam and its connecting parts 87 88, shaft 82, and pawls, (not shown,) are for the purpose of alining the total-adding wheels; but as these form no part of the present invention they are not shown in full detail and will not be further described.

*Hammer mechanism.*—This is illustrated especially in Figs. 1, 2, 3, 4, 5, 10, 12, 13, 14, 17, 20, 22, and 24. I provide a series of hammers, one for each series of keys and its corresponding type-bearing segment 11, except that I preferably provide but one hammer for both the tens and units and cents, and I also provide a separate hammer 13$^a$ for segment-disk 150, carrying certain words—such, for example, as are shown on the index 89 on the front of the machine. (See Figs. 2 and 12.) Each hammer is mounted upon a sleeve 90, and the various sleeves 90 are arranged loosely concentrically with one another upon a supporting-rod 91. Rod 91 is mounted in the side supports 92 of a carriage 93, which is slidingly mounted upon side rods 94, secured in the framework of the machine. Carriage 93 is composed of side supports 92 and cross-bars 95 and is movable longitudinally upon side rods 94. The object of making the carriage movable longitudinally is to enable the carriage to be moved backward to print the totals on the total-adding wheels whenever desired and to move it forward upon the printing-line of the type 12. Carriage 93 also carries paper-roll 96 of the paper 16 and the paper-rolls 200 and 201, which will be presently described.

I preferably provide means for operating the hammers independently of one another to a greater or less extent and preferably employ such means for this purpose which are normally out of operative range or position to operate the hammers and provide means adapted to be actuated by a key of any series to cause such means and the hammer corresponding to the series to which the said key belongs to be brought within operative position or range of each other and then cause the said means to operate the hammer as the machine is operated, as in the form shown in the drawings, by the turning of crank 2, all in a manner to be presently described. In my preferred form I move such operative means within operative range of the hammers or their connecting devices as the key is operated. I will now proceed to describe the particular devices shown in the drawings for this purpose. Of course the particular means employed may be widely varied without departing from my invention. As shown in Figs. 14 and 17, the stem of each key is provided with a roller 97, resting normally on the top of a swinging bar 98, the said bar carrying the rollers 97 of all the keys of the same series. When any key of the series is depressed, its roller 97 forces swinging bar 98 downward and to the right, as shown in Fig. 14, as swinging bar 98 is supported at each end upon swinging arms 99, pivoted at 100. A lower extension of one of the arms 99 connects pivotally with a rod 101, which is pivotally connected at its other end (see Fig. 3) with an arm 102, dependent from and secured to one of a set of sleeves 103, concentrically and loosely arranged on a rod 104, which runs from one side of the machine to the other, as shown in Fig. 13. These sleeves are so arranged on the shaft that three of them are on one side of the machine and four on the other, as shown in Fig. 13. Depending from each sleeve 104 is an arm 105, (see Fig. 4,) which is secured to the sleeve at its end near the side of the machine. Sleeves 104 are hollow and are nested or so arranged as to run one in through the other. Each rod 105 has pivotally connected to it a bar 106. (See Fig. 4.) Three of these bars are shown in Fig. 13 as at one side of the machine and four at the other. Each bar 106 is connected at its other end to a swinging arm 107, (see Figs. 4 and 22,) pivoted at 108 in the framework. The latter arm carries at its upper end a trigger 109, loosely pivoted at 110 to arm 107 and having toes 111 and 112. As the key is depressed swinging arm 107 is pulled toward an upright position, bringing toe 112 opposite to and in alinement with a downward projection 113 from its corresponding hammer-sleeve 90. In this position the trigger has been moved into operative position all ready to strike projection 113 and trip its hammer. This tripping or projection 113 and operation of the hammer is accomplished through crank 2 by means of a cam 114, mounted on shaft 6, on the opposite side of the machine from crank 2, as clearly shown in Fig. 5. The parts connecting cam 114 and the different triggers, as shown in the drawings, consist of the different devices—viz., a bell-crank lever 115, mounted on stud 116 in the framework, as a roller 117 engaging with cam 114. As shaft 6 turns, the roller and lever 115 are slowly moved to the right as viewed in Fig. 5, pushing in the same direction rod 118, pivotally connected to the end of one arm of lever 115.

119 is a crank-shaft connecting rod 118 with rock-shaft 120, which runs from one side of the machine to the other, as shown in Fig. 10, and which has at its two outer ends each a crank-shaft 121, each pivotally connected to a rod 122. Each rod 122 is pivotally connected to a short arm 123, fixed upon a sleeve 124, mounted upon a short stud 125, to which is rigidly secured a plate 126. There is one of these plates on each side of the machine, as shown in Fig. 10. As roller 117 is slowly forced to the right as viewed in Fig. 5 each plate 126 is slowly forced down in engagement with toe 111 of the different triggers 109 on each side of the machine, forcing toes 112 against the projection 113 of the different sleeves. The triggers and toes are held in rigid position by means of a stop-pin 127 on arm 107. It will of course be understood that each plate 126 in this action will only operate upon such of the triggers as have been brought into operative position. Each of such triggers through its toe 112 gradually forces projections 113 to the left as viewed in Fig. 4, straining spring 128 until toe 112 slips by projection 113, when spring 128 throws its sleeve and hammer sharply into their original position. A stop 129 (shown in Fig. 4) on the sleeve engages with a spring-stop 130 just before the hammer-head strikes the paper. The force of the blow is sufficient, however, to momentarily spring the hammer-arm and spring-stop 130 and deliver a sharp printing blow. All of the hammers representing the orders of numbers set up on the keys are of course operated at the same moment, and a number corresponding to that set up upon the keys is printed on the paper.

Stop 130 normally holds the hammer-faces just slightly above the paper and out of engagement with it.

Cam 114 is so shaped and the other parts are so arranged that the printing is done at the end of the operation of crank-wheel 2 and just before the machine stops.

By the above means the numbers set up upon the keys are automatically printed by the machine just before the keys that have been depressed are returned to their normal positions, and I am enabled to use individual hammers, one for each series of keys. As cents, both units and tens, are always printed, I preferably use but one hammer for them, which is the one opposite the side of the hammer 13ª, (see Fig. 2,) and of course I employ but one sleeve 90 for that purpose. Accordingly I use but one sleeve 103 for the units and tens of cents; but as each series of cents has to have for other reasons its same equipment of swinging bar 98, levers 99, rods 101, &c., I connect the arm 102 of each of those series with the same sleeve 103 as appears in Fig. 13.

The means for returning triggers and the other parts to their normal position after each operation of the machine will be presently described.

When it is desired to print a total from the total-adding wheels, the carriage 93 is pushed sharply backward along rods 94 and the total on those wheels will be automatically printed. For this purpose I provide a series of triggers, one for each series of keys and one or more additional ones for higher orders to which the addition may bring the figures, and arrange these triggers so that whenever any key of any series is operated the trigger corresponding to that series and the projection 113 from the sleeve of the corresponding hammer will be brought into operative alinement or position relative to each other, or when the adding-wheels carry to the next higher order the trigger representing that higher order and the projection from the sleeve of its corresponding hammer will be brought into similar relationship to each other. I prefer to do this by causing the operation of the key or the carrying-wheel to a higher number in the addition to move the proper trigger into a position where it is in alinement with the proper projection and ready to operate such projection to deliver a printing blow when the proper time arrives. I will now proceed to describe the preferred mechanism by which I accomplish this, as shown in the drawings.

In order to insure that each key when depressed will move its trigger 131 (see Fig. 4) for actuating its hammer to print the number on the corresponding series of the total-adding wheels, I connect swinging arm 107 by means of a link 132 with a similar swinging arm 133, which carries rigid at its upper end trigger 131. As this trigger when once set remains in fixed position at all times until the total-adding wheels are reset, I permanently latch springing arm 133 in its set position by means of a latch 134 on the end of loosely-pivoted arm 135, adapted to engage with a pin 136, projecting from the side of arm 133. Whenever carriage 93 is pushed backward to print the totals, projections 113 will strike such of the triggers 131 as have been set and will cause their corresponding hammers to print the totals appearing on the total-adding wheels in the manner described for the printing of the figures on the printing-line. As the units and tens of cents will always be printed on the total-adding wheels irrespective of what is done upon the machine, I preferably arrange a fixed stop 137 (shown in Fig. 13) for operating the cents-hammer. In order to insure that where the adding-wheels carry higher order of numbers the trigger 131 of that higher order shall be also set, I also connect one of the adding-wheels with each trigger, so that upon carrying to a higher order the trigger of the higher order will be set. In the form shown in the drawings I do this from wheel 22 by the following means: Pins 138 on wheel 22 are placed ten digits apart, and when the machine is at zero they are in a position shown in Fig. 3, with one of the pins resting against one arm of the bell-crank lever 139, pivoted on stud 140. Connected to lever 139 is a rod 141, and to it is connected an arm 142, rigidly secured to a sleeve 143 on a stationary rod 144. (Shown in Figs. 3 and 13.) The sleeves 143 are hollow and are arranged concentrically on the rod, one within another, three of them on one side of the machine and four on the other, as shown in Fig. 13. Each sleeve is rigidly connected at its other end to an arm 145, which is pivotally connected to a rod 146, (see Fig 4,) which rod is pivotally connected at its other end to swinging arm 133. As wheel 22 begins its movement, pin 38, which lies snugly against bell-crank lever 139, moves that lever and through the connections above described immediately moves the trigger 131 corresponding with the next higher order into its set position, where it is held until the adding-wheels are reset, as hereinafter described. This operation of setting the triggers 131 from the adding-wheels is wholly independent of the setting of the triggers directly from the operation of the keys. In order to avoid any interference of the one with the other, each rod 132 is provided at its right-hand end, as seen in Fig. 4, with a slot 147, which takes over a pin 148 of swinging arm 133. By this arrangement swinging arm 133 can be moved into its vertical position irrespective of its swinging arm 107, while the movement of a swinging arm 107 will always bring its corresponding swinging arm 133 into its vertical position if it has not already been placed there.

By the means above described I am enabled to quickly and easily print the totals from the printing adding-wheels at any time. All that is required is to push carriage 93 sharply backward to its limit of movement, and the printing is automatically done at substantially the close of that movement. In order to insure that the printing shall not be done while the carriage and paper are moving, I provide a stop 149 to check the backward movement of the carriage and to arrange the said triggers 131 in such position that they will operate the hammers to cause them to deliver their printing blow the instant the carriage has stopped against stop 149.

In the machine shown in the drawings I have shown the characters intended to be printed by the machine as numbers, which will ordinarily be the case in practical use. Any suitable characters may, however, be employed in place of numbers, if desired. In addition to the numbers shown in the drawings I also preferably provide means for printing alongside of each number upon the paper means for printing suitable words—such as, for example, would be used in banking—and in Fig. 2 on index 89 at the side of the bank of keys I have shown a list of words, any one of which may be printed opposite the number upon the paper. To accomplish this, I provide a printing-disk 150, bearing upon adapted to be actuated upon the operation of any key of the series, and means for restoring it to its locking position when the key is returned to its original position.

5. The combination of a series of keys, type-bearing devices, a wheel connected with said devices adapted to move them to bring different characters upon a printing or adding line, a projection from said wheel, a series of stops, one controlled by each key, said stops adapted to be projected into the rotary path of the projection from said wheel to limit the travel of the wheel and determine the particular character to be brought upon said line, and a supplementary locking-stop normally lying in front of the series of stops to prevent the said wheel from bringing any character upon said line until a key has been operated, a bar adapted to be moved upon the operation of any key of the series, and connections between the bar and the supplementary stop for withdrawing the stop from its operative position when a key is depressed.

6. A shaft, means for rotating it in one direction only, a sleeve mounted and adapted to rock thereon, one or more wheels connected with said sleeve and adapted to be moved thereby to bring characters upon the said line, and a detachable lock adapted to lock the shaft and its sleeve together to move the latter in one direction and to unlock them to permit it to rock backward, whereby a reciprocating motion may be imparted to the wheel or wheels notwithstanding the rotation of the shaft always in the same direction.

7. A shaft, means for rotating it in one direction only, a sleeve mounted and adapted to rock thereon, one or more wheels connected with the said sleeve, each wheel composed of two parts, one rigidly connected to the sleeve and the other loose thereon, a detachable lock adapted to connect the two parts of the wheel together to rotate the loose part or to disconnect them to permit the loose part to stop at any desired point without interfering with the continued rotation of the sleeve, a series of stops arranged so as to be capable of being projected at different points into the path of the loose part of each wheel, type-bearing mechanism connected with the loose part of the wheel, and a detachable lock adapted to lock the shaft and its sleeve together to move the latter in one direction and to unlock them to permit it to rock backward, whereby any desired type may be brought upon the printing or adding line without interference with the continued rotation of the sleeve and shaft.

8. A shaft, means for rotating it in one direction only, a sleeve mounted and adapted to rock thereon, one or more wheels connected with said sleeve, each wheel composed of two parts, one rigidly connected to the sleeve and the other loose thereon, a detachable lock adapted to connect the two parts of the wheel together to rotate the loose part or to disconnect them to permit the loose part to stop at any desired point without interfering with the continued rotation of the sleeve, a series of stops arranged so as to be capable of being projected at different points into the path of the loose part of each wheel, type-bearing mechanism connected with the loose part of the wheel, and a detachable lock adapted to lock the shaft and its sleeve together to move the latter in one direction and to unlock them to permit it to rock backward, means for automatically unlocking the lock between the shaft and sleeve, and means for rocking the sleeve back to its original position, whereby any desired type may be brought upon the printing or adding line without interference with the continued rotation of the sleeve and shaft.

9. A shaft, means for rotating it in one direction only, a sleeve mounted and adapted to rock thereon, one or more wheels connected with said sleeve, each wheel composed of two parts one rigidly connected to the sleeve and the other loose thereon, a detachable lock adapted to connect the two parts of the wheel together to rotate the loose part or to disconnect them to permit the loose part to stop at any desired point without interfering with the continued rotation of the sleeve, a spring connecting the fast and loose parts together and adapted to be strained as the parts separate, a series of stops arranged so as to be capable of being projected at different points into the path of the loose part of each wheel, type-bearing mechanism connected with the loose part of the wheel, and a detachable lock adapted to lock the shaft and its sleeve together to move the latter in one direction and to unlock them to permit it to rock backward, whereby any desired type may be brought upon the printing or adding line without interference with the continued rotation of the sleeve and shaft.

10. A shaft, means for rotating it in one direction only, a sleeve mounted and adapted to rock thereon, one or more wheels connected with said sleeve, each wheel composed of two parts one rigidly connected to the sleeve and the other loose thereon, a detachable lock adapted to connect the two parts of the wheel together to rotate the loose part or to disconnect them to permit the loose part to stop at any desired point without interfering with the continued rotation of the sleeve, a spring connecting the fast and loose part together and adapted to be strained as the parts separate, a series of stops arranged so as to be capable of being projected at different points into the path of the loose part of each wheel, type-bearing mechanism connected with the loose part of the wheel, and a detachable lock adapted to lock the shaft and its sleeve together to move the latter in one direction and to unlock them to permit it to rock backward, whereby any desired type may be brought upon the printing or adding line without interference with the continued rotation of the sleeve and shaft, pawls for holding the type-bearing mechanism in set position, printing mechanism and means for releasing and returning the parts to their normal positions.

11. A shaft, means for rotating it in one direction only, a sleeve mounted and adapted to rock thereon, a plurality of wheels mounted on said sleeve, each wheel composed of two parts, one rigidly connected to the sleeve and the other loose thereon, a spring connected with the loose part of each wheel and adapted to be strained as the said part rotates, a detachable lock adapted to connect the two parts of the wheel together to rotate the loose part or to disconnect them to permit the loose part to stop at any desired point without interfering with the continued rotation of the sleeve, a spring connecting the fast and loose parts together and adapted to be strained as the parts separate, a series of stops arranged so as to be capable of being projected at different points into the path of the loose part of each wheel, type-bearing mechanism connected with the loose parts of the wheel, the loose parts of the wheels and their connections with the type-bearing mechanisms being so constructed and arranged that the different type-bearing mechanisms will be moved successively one after another, and a detachable lock adapted to lock the shaft and its sleeve together to move the latter in one direction and to unlock them to permit it to rock backward, whereby any desired type may be brought upon the printing or adding line without interference with the continued rotation of the sleeve or shaft, pawls for holding the type-bearing mechanisms in set position, printing mechanism, and means for returning the parts to their original position.

12. The combination of a series of keys, type-bearing mechanism, adapted to bring different characters upon the printing or adding line, connections between the series of keys and the type-bearing mechanism, whereby the operation of any key will bring upon said line its corresponding character upon the type-bearing mechanism, a hammer, a trigger for operating said hammer normally out of alinement with the hammer, connections between the series of keys and the trigger adapted when a key is operated to throw said trigger into alinement with the hammer, and means for actuating the trigger.

13. The combination of a bank of keys composed of a plurality of series, type-bearing mechanism, one for each series of keys adapted to bring different characters upon the printing or adding line, connections between the keys of each series and its corresponding type-bearing mechanism, whereby the operation of any key of the series will bring upon said line its corresponding character upon its type-bearing mechanism, a series of hammers, one for each series of keys, a trigger for operating each hammer normally out of alinement with its hammer, connections between each series of keys and its trigger adapted, when any key of the series is operated, to throw its triggers into alinement with its hammer and means for actuating all of said triggers that have been moved into alinement.

14. The combination of a series of keys, type-bearing mechanism adapted to bring different characters upon the printing or adding line, connections between the series of keys and the type-bearing mechanism, whereby the operation of any key will bring upon said line its corresponding character upon the type-bearing mechanism, a hammer, a device for operating said hammer normally out of operative position, connections between the hammer-operating device adapted when a key is operated, to throw said device into operative position, and means for actuating said device, and means for releasing and returning the parts to their original position after the operation.

15. The combination of a bank of keys composed of a plurality of series, type-bearing mechanism, one for each series of keys adapted to bring different characters upon the printing or adding line, connections between the keys of each series and its corresponding type-bearing mechanism, whereby the operation of any key of the series will bring upon said line its corresponding character upon its type-bearing mechanism, a series of hammers, one for each series of keys, a device for operating each hammer normally out of operative position, connections between each series of keys and its hammer-operating device adapted when any key of the series is operated, to throw its hammer-operating device into operative position, and means for actuating all of the said devices that have been moved into operative position, and means for releasing and returning the parts to their original position after the operation.

16. In the impression mechanism of a machine for bringing characters upon a line, provided with a bank of keys, composed of a plurality of series, and provided with series of individual hammers, one hammer for each series of keys, and each hammer provided with a hammer-operating device, a plurality of sleeves nested one within another, each sleeve connected with one of the series of keys and with one of the hammer-operating devices.

17. The combination of a bank of keys composed of a plurality of series, type-wheels, having their bodies in the form of sleeves nested one within another, each body bearing at one end a segment carrying the type and at the other end a gear-segment, connections between the latter and its corresponding series of keys, for bringing upon the printing-line the type upon the wheels corresponding to the keys operated, whereby ample space may be provided for the keys and yet the type-wheels may be arranged compact and close together, and a series of retaining-pawls one for each type-segment arranged some on the inner side of their type-segments and others on the outer as the other bearing for said spool, while the right-hand spool 229 is mounted upon shaft 231, as shown in that figure. 231ª is a collar loose within bearings 232, fast in the framework of the machine, and a spring 236, pressing on the bearing 232 and against a shoulder at the left-hand end of collar 231ª, tends to hold the latter with a yielding pressure against the right-hand spool 229. One reason for making pin 235 spring-pressed and one reason for the use of collar 231ª and spring 236 is to aid in the insertion of spools 229 into the machine. When the spools are first placed in the machine and before shaft 231 is slipped through them, pin 235 holds the left-hand spool 229 in proper alinement and spring 236 and collar 231ª hold the right-hand spool 229 in proper alinement, so as to make it easier for the operator to insert shaft 231 through the spools. Each shaft 231 is similarly provided. Gear-wheels 233 are driven alternately from a common shaft 237, so that the feed is first in one direction and then the other. The change in the direction of feed is occasioned through levers 238, connected by an arm 239, one of the levers having a disk 240, projecting between two collars on shaft 237 to slide the shaft one way or the other as the levers 238 are moved one way or the other by buttons 241, one of each of which is secured near each end of one of the ribbons in the ordinary way. Each button 241 when the ribbon has been fed in one direction as far as it should go strikes against one of the levers 238 and disconnects one gear 242 on shaft 237 from its gear 233 and connects the other gear 242 with the other gear 233, thus changing the direction of feed. The ink-ribbons can be at any time moved either way, as desired, manually through knurl-buttons 243 and 244.

Inasmuch as the feed of each ink-ribbon is slow and is in the direction of the length of the lines of the type on the type-wheels 11 and total-adding wheels 17 and as many type are likely to fall on the same part of the ink-ribbon under these circumstances, especially in a machine of the character of the one here shown and described, I preferably arrange the ink-ribbons so that they shall be slightly inclined to the lines of type upon the type-wheels 11 and total-adding wheels 17. Owing to this slight angular arrangement of the ink-ribbons, which is clearly shown in Fig. 21, the type will not often fall upon the same spot, but upon slightly different places on the ink-ribbon, all of the ink-ribbon will be used, and the printing will be much more distinct. Shaft 237 is driven from shaft 120 through crank-arm 284, link 285, lever 286, rod 287, slide 288, and guides 289, carrying spring-pressed pawl 290, which engages with pawl 291 on shaft 237.

In case it is desired to operate the machine by other than hand-power I provide means for operating by foot-power, and such means are illustrated in Figs. 1, 25, and 26. In this case instead of connecting shaft 6 and gearing-wheel 179 with hand-crank 2 I connect gearing-wheel 179 with gearing and provide a device to be operated by the feet and flexible connections between the same and the gearing and means for returning the pedal and flexible connections to their original positions. 245 is the pedal. It is connected by a cord 246, which runs over the pulley 247, with one part of a drum 248, which is loose upon shaft 249. As the pedal is depressed this drum is rotated in one direction and through a pawl 250, which it carries, and a ratchet 251, also loose upon said shaft and connected fixedly with gear 252, rotates gear 179 through an intermediate gear 253. Pawl 254 and ratchet 255, integral with gear 252, prevent backward rotation of the parts. The parts are so arranged that a complete movement of the pedal will rotate gear 179 once. When the feet are withdrawn from the pedal, cord 246 is rewound upon drum 248 by means of a ribbon 256, secured at one end to a spring 257 and at its other end to another part of drum 248, as shown in Fig. 26, upon which it is wound and unwound. Spring 257, through ribbon 256, restores the parts to their original positions after an operation of the machine. As it is necessary in the operation of the machine to rotate sleeve 5 and its connections a full revolution, no more or no less, I preferably provide a stop which will permit a complete and exact revolution of these parts, but which will prevent any additional revolution, no matter how slight. I have illustrated in Fig. 11 the device which I prefer to use for this purpose. Upon wheel 26, which is fast to sleeve 5, I mount a stop-pin 258. 259 is a movable stop loosely pivoted at 260 in the framework and free to move between pins 261 on either side of it, these pins being also secured to the framework. Pins 261 act as stops to limit the swinging movement of movable stop 259. The parts are shown in full lines in Fig. 11 in the position they occupy before the operation of the machine with stop-pin 258, lying snugly against the right-hand side of stop-pin 259. As the sleeve is about to complete its revolution pin 258 strikes the left-hand side of stop 259 and throws it over into the position shown in dotted lines in Fig. 11, and in this position it acts as a rigid stop to stop pin 258 and its disk and sleeve. It will be observed that the pin 258 is in exactly the same position at the end that it occupied at the beginning.

It is sometimes desirable to reprint the numbers set up in the printing-line. In order to accomplish this without the necessity of resetting or depressing the same keys, I provide a repeat-key 260ª to throw the releasing mechanism out of operative position, so that the printing operation may be repeated without the necessity of resetting the keys. I accomplish this by providing the repeat-key with an inverted cone-shaped lower end 261ª in Fig. 7, which when depressed presses sidewise against a sloping upward projection 262 on the sleeve 168 of shaft 169. This sleeve end 168 is made in the form of a sleeve loose on shaft 169 but connected so as to rotate with it by means of pin 263, integral with the shaft moving in slot 264 of the sleeve. A spring 265 keeps the sleeve 168 and its dependent arm 167 in proper position; but when the repeat-key is depressed sleeve 168 and arm 167 are shoved to the left, so that arm 167 is moved out of range of the releasing-cam on wheel 166. The operation of the machine, therefore, does not return the keys and their connecting parts to their original position, but leaves them and the type they have set up upon the printing-line still in the position for reprinting.

It is sometimes desirable, as where a mistake has been made in striking the keys, to release the keys thus struck and their connecting mechanism without operating the machine. For this purpose I provide a release-key 266, which is shown in Figs. 2 and 29. This key carries on its stem a pin 267, adapted to engage with one of a pair of toggle-levers 268, one of which is secured at 269 in the framework and the other of which is secured to the bottom of releasing-arm 170. When the release-key is depressed, it causes toggle-levers 268 to throw releasing-arm 170 to the right, as shown in Fig. 29, which throws releasing-rod 171 against rod 99, restoring the keys and their triggers to their normal position.

In order to bring crank 2 to a sharp stop to prevent a too rapid operation of the machine, I provide a stop which is shown in Fig. 4. Wheel 80, fast upon shaft 6, is provided with a pin 270. 271 is a lever pivoted at 272 in the framework and pressed by a spring 273. Toward the close of the revolution of crank 2 and wheel 80, pin 270 strikes on the under side of one arm of lever 271 and throws the other end 274 against a shoulder 275 of the wheel, bringing it to a complete stop. Projecting finger 276 of the lever prevents the lever from being thrown too far down on the surface of shoulder 275. Pin 270, lever 271, and shoulder 275 are so arranged that the moment lever 271 is thrown up 274 will make contact with shoulder 275. By that time pin 270 has cleared the other arm of the lever 271, and spring 273 immediately separates shoulder 274 and shoulder 275, permitting another operation of the crank immediately thereafter should the same be desired.

In the drawings herewith I have shown only the form or embodiment of my invention which I prefer; but my invention is not limited to such a form or embodiment. Many changes in or departures from the form shown in the drawings may be made without departing from my invention, the essentials of which are set forth in the claims appended hereto.

What I claim as new, and desire to secure by Letters Patent, is as follows:

1. The combination of a series of keys, a series of screens for the keys each screen adapted to be moved over its key to hide it or to be moved away from its key, and an overlying casing arranged above the keys and screens and provided with apertures below which the keys are placed, all so arranged that the keys are operated by being struck through the apertures, and the keys and screens are protected by the casing.

2. The combination of a series of keys, type-bearing devices, a wheel connected with said devices adapted to move them to bring different characters upon a printing or adding line, a projection from said wheel, a series of stops, one controlled by each key, said stops adapted to be projected into the rotary path of the projection from said wheel to limit the travel of the wheel and determine the particular character to be brought upon said line, and a supplementary locking-stop normally lying in front of the series of stops to prevent the said wheel from bringing any character upon said line until a key has been operated, and means for withdrawing such supplementary locking-stop from operative position adapted to be actuated upon the operation of any key of the series.

3. The combination of a bank of keys consisting of a plurality of series of keys, type-bearing devices, a series of wheels connected with said devices, one for each series of keys, adapted to move said type-bearing devices to bring different characters upon a printing or adding line, a projection from each wheel, a series of stops for each wheel, each stop controlled by a key of the corresponding series of keys, said stops adapted to be projected into the rotary path of the projection from said wheel to limit the travel of the wheel and determine the particular character to be brought upon said line, and a supplementary locking-stop for each series of stops normally lying in front of the said series to prevent the corresponding wheel from bringing any character on said line until a key of the corresponding series has been operated, and means for withdrawing each supplementary locking-stop from operative position adapted to be actuated upon the operation of any key of the corresponding series.

4. The combination of a series of keys, type-bearing devices, a wheel connected with said devices adapted to move them to bring different characters upon a printing or adding line, a projection from said wheel, a series of stops, one controlled by each key, said stops adapted to be projected into the rotary path of the projection from said wheel to limit the travel of the wheel and determine the particular character to be brought upon said line, and a supplementary locking-stop normally lying in front of the series of stops to prevent the said wheel from bringing any character upon said line until a key has been operated, means for withdrawing such supplementary locking-stop from operative position side, to allow room for such of the gear-segments as fall within the side lines of the type-segments.

18. In a machine for bringing characters upon a printing-line, the combination of a bank of keys composed of a plurality of series, type-wheels, one for each series of keys, connections between the keys and the type-wheels to bring upon the printing-line the type upon the type-wheels corresponding to the characters upon the keys operated, rolls adapted for holding in position and feeding a recording-strip past the printing-line, a power-wheel, connections between the power-wheel and the rolls to feed the recording-strip, such connections including a cam loosely mounted concentrically with the power-wheel and adapted to be driven thereby, yielding connections between the wheel and the cam to permit the cam to be moved a certain distance after the power-wheel has finished its rotation, and connections between the cam and the rolls for feeding the paper, all so arranged that as the cam is moved by the cam-wheel, the paper-feeding devices of the rolls will be moved in one direction, and when the wheel has stopped its rotation the cam will actuate, by its further movement, its connections with the paper-rolls to feed the paper.

19. In the paper-feeding mechanism of a calculating-machine, a rotary member, a cam loosely mounted thereon by pin-and-slot connections so that the cam can rotate after the rotary member stops, a surface of the cam engaging with the paper-feeding devices of the paper-rolls to move them in one direction, another surface of the cam adapted to come into engagement with such parts only when the rotary member has finished its rotation, and springs connected with such parts to force them along the said surface of the cam to their original position to move the paper-feeding devices of the rolls in the other direction to feed the recording-strip.

20. For printing purposes, the combination of a bank of keys composed of a plurality of series, a series of type-wheels, one for each series of keys, connections between the keys and the type-wheels for actuating the latter to bring upon the printing or adding line the characters upon the type-wheels corresponding with those on the keys operated, and an ink-ribbon-feeding device adapted to feed the ink-ribbon at an acute angle to the printing-line.

21. In a machine for bringing numbers upon a printing-line the combination with the type-wheels bringing the number-type upon the line and their actuating mechanism, of a type-wheel carrying type representing a series of words, and means adapted to be manually actuated for bringing upon the printing-line the type upon said wheel representing any word of the series, a hammer for said word type-wheel, a hammer-operating device normally out of operative position, means under the control of the operator for moving said hammer-operating device into operative position, a means connected with the hammer-operating mechanism of the rest of the machine for actuating the said hammer-operating device to cause its hammer to print the word upon the word type-wheel which is on the printing-line, whereby at the will of the operator any word of the series may be printed along with the numbers set up upon the machine.

22. The combination of a bank of keys composed of a plurality of series, type-bearing mechanism, one for each series of keys adapted to bring different characters upon the line, connections between the keys of each series and its corresponding type-bearing mechanism, whereby the operation of any key of the series will bring upon said line its corresponding character upon its type-bearing mechanism, a series of hammers, one for each series of keys, a hammer-operating device for each hammer normally out of operative position, connections between the keys and the hammer-operating devices so constructed and arranged that, when any key of any series is operated, it will move its hammer into operative position and will also, at the same time, move all the hammer-operating devices of lower orders into their operative positions, and means for actuating all of the hammer-actuating devices that have been moved into operative position.

23. In the impression mechanism of a calculating-machine, the combination of a series of hammers, one for each series of keys, a series of hammer-operating devices, one for each hammer normally out of operative position, means for throwing each hammer-operating device into operative position adapted to be actuated by the operation of any key of the series corresponding to such hammer-operating device, and connections between the means for setting the different hammer-operating devices, all so arranged that the operation of any key will not only move its hammer-operating device into operative position, but will also move into operative position the hammer-operating devices representing all the lower orders of digits, and means for actuating all of the hammer-operating devices that have been moved into operative position.

In testimony whereof I have signed my name to this specification in the presence of two subscribing witnesses.

ALONZO R. BOYNTON.

Witnesses:
 JOSHUA W. W. CAPEN,
 H. LESTER HACKNEN.

Correction in Letters Patent No. 745,145.

It is hereby certified that in Letters Patent No. 745,145, granted November 24, 1903, upon the application of Alonzo R. Boynton, of Binghamton, New York, for an improvement in "Printing-Machines," an error appears in the printed specification requiring correction, as follows: Page 14, after line 80, the words *series of keys and the* should be inserted at the end of the line; and that the said Letters Patent should be read with this correction therein that the same may conform to the record of the case in the Patent Office.

Signed and sealed this 15th day of December, A. D., 1903.

[SEAL.]

F. I. ALLEN,
*Commissioner of Patents.*